(12) United States Patent
Zhu et al.

(10) Patent No.: US 11,902,379 B2
(45) Date of Patent: Feb. 13, 2024

(54) METHOD FOR DETERMINING SSC MODE AND APPARATUS

(71) Applicant: Huawei Technologies Co., Ltd., Shenzhen (CN)

(72) Inventors: Qianghua Zhu, Beijing (CN); Fenqin Zhu, Shanghai (CN); Wenfu Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/992,770

(22) Filed: Aug. 13, 2020

(65) Prior Publication Data

US 2020/0374350 A1 Nov. 26, 2020

Related U.S. Application Data

(63) Continuation of application No. PCT/CN2019/075000, filed on Feb. 13, 2019.

(30) Foreign Application Priority Data

Feb. 13, 2018 (CN) .......................... 201810151037.2

(51) Int. Cl.
  *H04W 76/19* (2018.01)
  *H04W 36/00* (2009.01)
  (Continued)

(52) U.S. Cl.
  CPC .................................. *H04L 67/142* (2013.01)

(58) Field of Classification Search
  CPC .... H04L 67/142; H04W 76/18; H04W 24/04; H04W 36/0011; H04W 8/24; H04W 80/10

(Continued)

(56) References Cited

U.S. PATENT DOCUMENTS

2015/0289167 A1* 10/2015 Alex ................... H04L 41/0893
  370/329
2017/0339623 A1* 11/2017 Pillay-Esnault ........ H04L 45/74
(Continued)

FOREIGN PATENT DOCUMENTS

WO 2018006017 A1 1/2018

OTHER PUBLICATIONS

3GPP TR 23.799 V1.0.2 (Sep. 2016), "3rd Generation Partnership Project; Technical Specification Group Services and System Aspects; Study on Architecture for Next Generation System (Release 14)," 423 pages.

(Continued)

*Primary Examiner* — Kevin T Bates
*Assistant Examiner* — Golam Mahmud
(74) *Attorney, Agent, or Firm* — Conley Rose, P.C.

(57) ABSTRACT

A method for determining a service and session continuity (SSC) mode and an apparatus, where the method includes: determining, by a terminal device, a requested SSC mode; and sending a first request message to a first core network element, where the first request message is used to request to establish a first protocol data unit (PDU) session, and the first request message includes a session type of the first PDU session, the requested SSC mode, and first indication information. The first request message sent by the terminal device to the first core network element may carry the first indication information, used to indicate that the SSC mode requested by the terminal device is not allowed to be modified, to prevent a network-side network element from subsequently making an erroneous decision, for example, modifying the requested SSC mode to another SSC mode that is not supported by the terminal device.

19 Claims, 12 Drawing Sheets

(51) Int. Cl.
*H04W 48/18* (2009.01)
*H04W 76/30* (2018.01)
*H04W 12/06* (2021.01)
*H04W 76/10* (2018.01)
*H04L 67/142* (2022.01)

(58) Field of Classification Search
USPC .......................................................... 709/227
See application file for complete search history.

(56) References Cited

U.S. PATENT DOCUMENTS

| | | | | |
|---|---|---|---|---|
| 2018/0227873 | A1* | 8/2018 | Vrzic | H04W 28/26 |
| 2019/0150219 | A1* | 5/2019 | Wang | H04W 76/30 370/329 |
| 2019/0230571 | A1* | 7/2019 | Kawasaki | H04W 36/36 |
| 2019/0313468 | A1* | 10/2019 | Talebi Fard | H04W 76/12 |
| 2020/0053803 | A1* | 2/2020 | Youn | H04L 67/148 |
| 2020/0120570 | A1* | 4/2020 | Youn | H04W 76/11 |
| 2020/0296777 | A1* | 9/2020 | Tang | H04W 4/24 |
| 2020/0323029 | A1* | 10/2020 | Lu | H04W 76/25 |
| 2021/0185524 | A1* | 6/2021 | Wu | H04W 12/043 |

OTHER PUBLICATIONS

Cisco, et al., "Clarifications for session and service continuity framework," SA WG2 Meeting #115 S2-163118, May 23-27, 2016, Nanjing, P.R. China, 7 pages.
China Mobile, "23.501: Clarify the SSC mode selection behaviour of SMF," SA WG2 Meeting #124 S2-179365, Nov. 27-Dec. 1, 2017, Reno, NV, USA, 2 pages.
S2-164022 ZTE Corporation et al.,"Session Management model with UL-CL in Ran",SA WG2 Meeting #116,Jul. 4-8, 2016, Vienna, Austria, total 3 pages.
S2-164429 LG Electronics,"Support of service continuity using tunnelling between UP Functions",SA WG2 Meeting #116bis,Aug. 29-Sep. 2, 2016, Sanya, China, total 7 pages.
R2-167661 Nokia et al.,"Status of NG study in SA2",3GPP TSG-RAN WG2 Meeting #96,Reno, USA, Nov. 14-18, 2016,total 17 pages.
3GPP TS 23.501 V0.3.0 (Feb. 2017),3rd Generation Partnership Project; Technical Specification Group Services and System Aspects-;System Architecture for the 5G System;Stage 2(Release 15),total 97 pages.
S2-163186 Intel,"Update of Solution 6.1",SA WG2 Meeting #115,May 23-27, 2016, Nanjing, P.R. China,total 9 pages.
C1-180283 Sharp,"Pseudo-CR on DN authentication failed cause",3GPP TSG-CT WG1 Meeting #108,Gothenburg (Sweden), Jan. 22-26, 2018,total 6 pages.
3GPP TS 23.501 V15.0.0 (Dec. 2017),3rd Generation Partnership Project; Technical Specification Group Services and System Aspects-;System Architecture for the 5G System;Stage 2(Release 15), total 181 pages.
3GPP TS 23.502 V15.0.0 (Dec. 2017),3rd Generation Partnership Project;Technical Specification Group Services and System Aspects;Procedures for the 5G System;Stage 2(Release 15), total 257 pages.
3GPP TS 23.503 V15.0.0 (Dec. 2017),3rd Generation Partnership Project;Technical Specification Group Services and System Aspects;Policy and Charging Control Framework for the 5G System;Stage 2(Release 15),total 56 pages.
Ericsson et al., "5G SM—rejecting PDU session establishment due to not acceptable SSC mode," 3GPP TSG-CT WG1 Meeting #108, C1-180012, Gothenburg (Sweden), Jan. 22-26, 2017, 5 pages.
Ericsson, "5G SM—editor's notes in network-requested PDU session modification procedure," 3GPP TSG-CT WG1 Meeting #108, C1-180037, Gothenburg (Sweden), Jan. 22-26, 2018, 4 pages.
Ericsson, 5G SM—message contents, 3GPP TSG CT WG1 #105 C1-172807, Aug. 21-25, 2017, 13 pages.
OPPO, UE Route Selection Policy, 3GPP TSG SA WG2 #124 S2-178438, Nov. 27-Dec. 1, 2017, 10 pages.
Huawei, "Additional PDU Session Type in Route Selection Descriptor," 3GPP TSG SA WG2 #125 S2-180967, Jan. 22-26, 2018, 12 pages.

* cited by examiner

METHOD FOR DETERMINING SSC MODE AND APPARATUS

CROSS-REFERENCE TO RELATED APPLICATIONS

This application is a continuation of International Patent Application No. PCT/CN2019/075000, filed on Feb. 13, 2019, which claims priority to Chinese Patent Application No. 201810151037.2, filed on Feb. 13, 2018. The disclosures of the aforementioned applications are hereby incorporated by reference in their entireties.

TECHNICAL FIELD

The present disclosure relates to the field of wireless communications technologies, and in particular, to a method for determining an SSC mode and an apparatus.

BACKGROUND

A service and session continuity (SSC) mode is one of attributes of a protocol data unit (PDU) session in a wireless communications system. The SSC mode usually has three values: SSC mode 1, SSC mode 2, and SSC mode 3. For a session of SSC mode 1, a PDU session anchor (PSA) of the session does not change during existence of the session. For a session of SSC mode 2, a PSA of the session may perform switching by first releasing an old session and then creating a new session. For a session of SSC mode 3, a PSA of the session may perform switching by first creating a new session and then deleting an old session, and the new session and the old session coexist for a period of time.

In a standard Release 15 (R15) release, for an SSC mode 3 of an Ethernet session and an SSC mode 3 of an unstructured session, a terminal device cannot select a new session or an old session to transmit uplink data in a period during which the new session and the old session coexist. Therefore, to reduce complexity of the R15 release protocol, an SSC mode of the Ethernet session and an SSC mode of the unstructured session each are limited to the SSC mode 1 or the SSC mode 2, and cannot be the SSC mode 3.

However, a 5th Generation (5G) mobile communications system supports ultra-reliable and low latency communications (URLLC) service, and the URLLC service needs to support the SSC mode 3 when the URLLC service is provided with ultra-reliability and a low latency based on the Ethernet session. Therefore, to support the URLLC service, the Ethernet session needs to support the SSC mode 3. In this way, two types of terminal devices with different capabilities may appear. One type is an R15 terminal device that does not support an Ethernet session of SSC mode 3. The other type is an R16 terminal device that supports the Ethernet session of SSC mode 3. Correspondingly, two types of 5G networks with different capabilities may appear. One type is an R15 5GC that does not support the Ethernet session of SSC mode 3. The other type is an R16 5GC that supports the Ethernet session of SSC mode 3. In this case, how to determine an SSC mode of a session needs to be further studied.

SUMMARY

This application provides a method for determining an SSC mode, to resolve a technical problem that an error may occur in determining an SSC mode in other approaches.

In a 5G network, each PDU session may include one or more of the following five attributes: single network slice selection assistance information (S-NSSAI), a data network name (DNN), a PDU session type, a service and session continuity (SSC) mode, and a PDU session identity (ID). The PDU session identity uniquely identifies one session on a user equipment (UE). For example, the PDU session type includes an Internet Protocol session (e.g., an IP version 4 (IPv4) or IP version 6 (IPv6) session), an Ethernet session, and an unstructured session. In embodiments of this application, the Ethernet session and the unstructured session are collectively referred to as Non-IP sessions.

According to a first aspect, an embodiment of this application provides a method for determining an SSC mode. The method includes: determining, by a terminal device, a requested SSC mode; and sending, by the terminal device, a first request message to a first core network element, where the first request message is used to request to establish a first PDU session, and the first request message includes a session type of the first PDU session and the requested SSC mode.

In a possible design, the first request message further includes first indication information, and the first indication information is used to indicate that the requested SSC mode is not allowed to be modified.

In this way, the first request message sent by the terminal device to the first core network element may carry the first indication information used to indicate that the SSC mode requested by the terminal device is not allowed to be modified, to prevent a network-side network element from subsequently making an erroneous decision, for example, modifying the requested SSC mode to another SSC mode that is not supported by the terminal device.

In a possible design, before the determining, by a terminal device, a requested SSC mode, the method further includes: sending, by the terminal device, capability information of the terminal device to a second core network element, where the capability information of the terminal device is used to indicate whether the terminal device supports an SSC mode 3 of a Non-IP session; receiving, by the terminal device, first SSC mode limitation information from the second core network element. The first SSC mode limitation information is determined based on the capability information of the terminal device, subscription information of the terminal device, and network capability information, where the subscription information is used to indicate a session type and an associated SSC mode that are allowed for a PDU session of the terminal device, and where the network capability information is used to indicate whether a network supports the SSC mode 3 of the Non-IP session. Additionally, the determining, by a terminal device, a requested SSC mode includes determining, by the terminal device, the requested SSC mode based on the session type of the first PDU session and the first SSC mode limitation information.

In a possible design, the determining, by a terminal device, a requested SSC mode includes: receiving, by the terminal device, first SSC mode limitation information from a third core network element, where the first SSC mode limitation information is determined based on capability information of the terminal device, subscription information of the terminal device, network capability information, and an application function (AF) policy, the capability information of the terminal device is used to indicate whether the terminal device supports an SSC mode 3 of a Non-IP session, the subscription information is used to indicate a session type and an associated SSC mode that are allowed for a PDU session of the terminal device, the network capability information is used to indicate whether a network supports the SSC mode 3 of the Non-IP session, and the AF policy includes at least one application identity and an associated SSC mode; and determining, by the terminal device, the requested SSC mode based on the application identity, the session type of the first PDU session, and the first SSC mode limitation information.

In this way, the first SSC mode limitation information is determined based on a plurality of types of information, in other words, in full consideration of a plurality of dimensions of information, such that the first SSC mode limitation information is more proper and effective.

In a possible design, the requested SSC mode is a unique SSC mode that meets the first SSC mode limitation information.

In this way, the SSC mode requested by the terminal device may be obtained by the terminal device based on the first SSC mode limitation information, such that the terminal device can determine whether the requested SSC mode is allowed to be modified, and add the first indication information to the first request message if the requested SSC mode is not allowed to be modified (that is, the requested SSC mode is the unique SSC mode that meets the first SSC mode limitation information).

In a possible design, the determining, by a terminal device, a requested SSC mode includes: using, by the terminal device as the requested SSC mode, an SSC mode provided by an application program; or obtaining, by the terminal device, the requested SSC mode according to a default SSC mode selection policy rule.

In a possible design, after the sending, by the terminal device, a first request message to a first core network element, the method further includes receiving, by the terminal device, a first response message from the first core network element, where the first response message is used to indicate that establishment of the first PDU session is rejected.

In a possible design, the first response message includes a cause code about the rejection to establish the first PDU session, and the cause code is used to indicate at least one of the following: the terminal device does not support the requested SSC mode; the network does not support the requested SSC mode; a data network DN does not support the requested SSC mode; or a subscription does not support the requested SSC mode.

In a possible design, after the receiving, by the terminal device, a first response message from the first core network element, the method further includes: if the cause code is used to indicate that the terminal device does not support the requested SSC mode and/or that the subscription does not support the requested SSC mode, determining, by the terminal device, the requested SSC mode as an SSC mode that is not associated with the session type of the first PDU session; or if the cause code is used to indicate that the network does not support the requested SSC mode, determining, by the terminal device when an accessed public land mobile network (PLMN) does not change, the requested SSC mode as an SSC mode that is not associated with the session type of the first PDU session; or if the cause code is used to indicate that the DN does not support the requested SSC mode, determining, by the terminal device when a data network name (DNN) does not change, the requested SSC mode as an SSC mode that is not associated with the session type of the first PDU session.

In this way, the first response message includes the cause code about the rejection of the first PDU session, such that the terminal device can perform a corresponding operation based on the cause code.

In a possible design, the first response message further includes an allowed SSC mode of the first PDU session.

In a possible design, after the receiving, by the terminal device, a first response message from the first core network element, the method further includes: sending, by the terminal device, a fourth request message to the first core network element based on the first response message, where the fourth request message is used to request to establish the first PDU session, and the fourth request message includes the allowed SSC mode of the first PDU session.

In a possible design, the first core network element is an SMF network element, the second core network element is an AMF network element, and the third core network element is a policy control function (PCF) network element.

According to a second aspect, an embodiment of this application provides a method for determining an SSC mode. The method includes: receiving, by a first core network element, a first request message from a terminal device, where the first request message includes a session type of a first PDU session and a requested SSC mode; and returning, by the first core network element, a first response message to the terminal device.

In a possible design, the first request message further includes first indication information, and the first indication information is used to indicate that the requested SSC mode is not allowed to be modified.

In a possible design, the first response message is used to indicate that the requested SSC mode is rejected.

In a possible design, before the returning, by the first core network element, a first response message to the terminal device, the method further includes: obtaining, by the first core network element, determining information, where the determining information includes one or more of subscription information of the terminal device, network capability information, DN authentication information, and capability information of the terminal device, the subscription information is used to indicate a session type and an associated SSC mode that are allowed for a PDU session of the terminal device, the network capability information is used to indicate whether a network supports an SSC mode 3 of a Non-IP session, the capability information of the terminal device is used to indicate whether the terminal device supports the SSC mode 3 of the Non-IP session, and the DN authentication information is used to indicate a session type of a PDU session supported by a DN and an associated SSC mode; and determining, by the first core network element based on the determining information, that the requested SSC mode is not supported.

In a possible design, the first response message includes a cause code about a rejection to establish the first PDU session.

In a possible design, if the first core network element determines, based on the subscription information of the terminal device, that the requested SSC mode is not supported, the cause code indicates that a subscription does not support the requested SSC mode; or if the first core network element determines, based on the network capability information, that the requested SSC mode is not supported, the cause code indicates that the network does not support the requested SSC mode; or if the first core network element determines, based on the DN authentication information, that the requested SSC mode is not supported, the cause code indicates that the DN does not support the requested SSC mode; or if the first core network element determines, based on the capability information of the terminal device, that the requested SSC mode is not supported, the cause code indicates that the terminal device does not support the requested SSC mode.

In a possible design, the first response message further includes an allowed SSC mode of the first PDU session.

In a possible design, the first core network element is an access and mobility management function (AMF) network element or a session management function (SMF) network element, and before the returning, by the first core network element, a first response message to the terminal device, the method further includes: obtaining, by the first core network element, first SSC mode limitation information, where the first SSC mode limitation information is determined based on subscription information of the terminal device, network capability information, and capability information of the terminal device; and determining, by the first core network element based on the first SSC mode limitation information, that the requested SSC mode is not supported.

For example, the first core network element is an AMF network element, and before the returning, by the first core network element, a first response message to the terminal device, the method further includes: obtaining, by the AMF network element, first SSC mode limitation information, where the first SSC mode limitation information is determined based on subscription information of the terminal device, network capability information, and capability information of the terminal device; and determining, by the AMF network element based on the SSC mode limitation information, that the requested SSC mode is not supported.

For example, the first core network element is an SMF network element, and before the returning, by the first core network element, a first response message to the terminal device, the method further includes: receiving, by the SMF network element, first SSC mode limitation information from a PCF network element or an AMF network element, where the first SSC mode limitation information is determined based on subscription information of the terminal device, network capability information, capability information of the terminal device, (and an AF policy); and determining, by the SMF network element based on the SSC mode limitation information, that the requested SSC mode is not supported.

According to a third aspect, an embodiment of this application provides a method for determining an SSC mode. The method includes: obtaining, by a second core network element, capability information of a terminal device, subscription information of the terminal device, and network capability information, where the capability information of the terminal device is used to indicate whether the terminal device supports an SSC mode 3 of a Non-IP session, the subscription information is used to indicate a session type and an associated SSC mode that are allowed for a PDU session of the terminal device, and the network capability information is used to indicate whether a network supports the SSC mode 3 of the Non-IP session; and obtaining, by the second core network element, first SSC mode limitation information based on the capability information of the terminal device, the subscription information of the terminal device, and the network capability information.

Based on the third aspect, in a first possible design, the obtaining, by the second core network element, first SSC mode limitation information based on the capability information of the terminal device, the subscription information of the terminal device, and the network capability information includes: generating, by the second core network element, second SSC mode limitation information based on the capability information of the terminal device, the subscription information of the terminal device, and the network capability information; sending, by the second core network element, the second SSC mode limitation information to a third core network element; and receiving the first SSC mode limitation information returned by the third core network element based on the second SSC mode limitation information.

Based on the third aspect or the first possible design of the third aspect, in a second possible design, the method further includes sending, by the second core network element, the first SSC mode limitation information to the terminal device.

Based on the third aspect, the first possible design of the third aspect, or the second possible design of the third aspect, in a third possible design, after the sending, by the second core network element, the first SSC mode limitation information to the terminal device, the method further includes: receiving, by the second core network element, a second request message from the terminal device, where the second request message includes a session type of a first PDU session and a requested SSC mode; and returning, by the second core network element, a second response message to the terminal device after determining, based on the first SSC mode limitation information, that the SSC mode requested by the terminal device is not supported, where the second response message is used to indicate that the SSC mode requested by the terminal device is rejected.

Optionally, the second request message may further include first indication information.

In the third aspect, the first possible design of the third aspect, the second possible design of the third aspect, or the third possible design of the third aspect, the second core network element is an AMF network element or an SMF network element, and the third core network element is a PCF network element.

Based on the third aspect, in a fourth possible design, the obtaining, by the second core network element, first SSC mode limitation information based on the capability information of the terminal device, the subscription information of the terminal device, and the network capability information includes obtaining, by the second core network element, the first SSC mode limitation information based on the capability information of the terminal device, the subscription information of the terminal device, the network capability information, and an AF policy, where the AF policy includes an application identity and an associated SSC mode.

Based on the third aspect or the fourth possible design of the third aspect, the second core network element is a PCF network element.

According to a fourth aspect, an embodiment of this application provides a method for determining an SSC mode. The method includes: receiving, by a second core network element, a third request message that is sent by a terminal device, where the third request message includes a session type of a first PDU session and a requested SSC mode; and returning, by the second core network element, a third response message to the terminal device after determining that the requested SSC mode is not supported, where the third response message is used to indicate that the SSC mode requested by the terminal device is modified to a new SSC mode and that the new SSC mode is a unique allowed SSC mode.

In a possible design, the second core network element is an SMF network element.

Additionally, the SMF network element may determine, based on determining information, whether the requested SSC mode is supported, where the determining information includes one or more of subscription information of the terminal device, network capability information, DN authentication information, or capability information of the terminal device.

According to a fifth aspect, an embodiment of this application further provides a terminal device. The terminal device may be configured to implement the method for determining an SSC mode in the foregoing first aspect. The function may be implemented by software. In a possible design, the terminal device includes a processing module and a transceiver module.

The processing module is configured to determine a requested SSC mode. The transceiver module is configured to send a first request message to a first core network element, where the first request message is used to request to establish a first PDU session, and the first request message includes a session type of the first PDU session and the requested SSC mode.

In a possible design, the first request message further includes first indication information, and the first indication information is used to indicate that the requested SSC mode is not allowed to be modified.

In a possible design, before the processing module determines the requested SSC mode, the transceiver module is further configured to: send capability information of the terminal device to a second core network element, where the capability information of the terminal device is used to indicate whether the terminal device supports an SSC mode 3 of a Non-IP session; and receive first SSC mode limitation information from the second core network element, where the first SSC mode limitation information is determined based on the capability information of the terminal device, subscription information of the terminal device, and network capability information, the subscription information is used to indicate a session type and an associated SSC mode that are allowed for a PDU session of the terminal device, and the network capability information is used to indicate whether a network supports the SSC mode 3 of the Non-IP session. Further, the processing module is configured to determine the requested SSC mode based on the session type of the first PDU session and the first SSC mode limitation information.

In a possible design, the transceiver module is further configured to receive first SSC mode limitation information from a third core network element, where the first SSC mode limitation information is determined based on capability information of the terminal device, subscription information of the terminal device, network capability information, and an AF policy, the capability information of the terminal device is used to indicate whether the terminal device supports an SSC mode 3 of a Non-IP session, the subscription information is used to indicate a session type and an associated SSC mode that are allowed for a PDU session of the terminal device, the network capability information is used to indicate whether a network supports the SSC mode 3 of the Non-IP session, and the AF policy includes at least one application identity and an associated SSC mode. Additionally, the processing module is configured to determine the requested SSC mode based on the application identity, the session type of the first PDU session, and the first SSC mode limitation information.

In a possible design, the requested SSC mode is a unique SSC mode that meets the first SSC mode limitation information.

In a possible design, the processing module is configured to: use, as the requested SSC mode, an SSC mode provided by an application program; or obtain the requested SSC mode according to a default SSC mode selection policy rule.

In a possible design, after sending the first request message to the first core network element, the transceiver module is further configured to receive a first response message from the first core network element, where the first response message is used to indicate that establishment of the first PDU session is rejected.

In a possible design, the first response message includes a cause code about the rejection to establish the first PDU session, and the cause code is used to indicate at least one of the following: the terminal device does not support the requested SSC mode; the network does not support the requested SSC mode; a data network DN does not support the requested SSC mode; or a subscription does not support the requested SSC mode.

In a possible design, the processing module is further configured to: if the cause code is used to indicate that the terminal device does not support the requested SSC mode and/or that the subscription does not support the requested SSC mode, determine the requested SSC mode as an SSC mode that is not associated with the session type of the first PDU session; or if the cause code is used to indicate that the network does not support the requested SSC mode, determine, when an accessed PLMN does not change, the requested SSC mode as an SSC mode that is not associated with the session type of the first PDU session; or if the cause code is used to indicate that the DN does not support the requested SSC mode, determine, when a DNN does not change, the requested SSC mode as an SSC mode that is not associated with the session type of the first PDU session.

In a possible design, the first response message further includes an allowed SSC mode of the first PDU session. When attempting again to request to establish the first PDU session, the terminal device may select a requested SSC mode based on the allowed SSC mode of the first PDU session.

In a possible design, after the receiving, by the terminal device, a first response message from the first core network element, the method further includes: sending, by the terminal device, a fourth request message to the first core network element based on the first response message, where the fourth request message is used to request to establish the first PDU session, and the fourth request message includes the allowed SSC mode of the first PDU session.

According to a sixth aspect, an embodiment of this application further provides a core network element. The core network element may be configured to implement the method for determining an SSC mode in the foregoing second aspect, third aspect, or fourth aspect. The function may be implemented by software. In a possible design, the core network element includes a receiving module, a sending module, and a processing module.

In an example of implementing the method for determining an SSC mode in the foregoing second aspect, the receiving module is configured to receive a first request message from a terminal device, where the first request message includes a session type of a first PDU session and a requested SSC mode. The sending module is configured to return a first response message to the terminal device.

In a possible design, the first request message further includes first indication information, and the first indication information is used to indicate that the requested SSC mode is not allowed to be modified.

In a possible design, the first response message is used to indicate that the requested SSC mode is rejected.

In a possible design, the processing module is configured to: obtain determining information, where the determining information includes one or more of subscription information of the terminal device, network capability information, DN authentication information, and capability information of the terminal device, the subscription information is used to indicate a session type and an associated SSC mode that are allowed for a PDU session of the terminal device, the network capability information is used to indicate whether a network supports an SSC mode 3 of a Non-IP session, the capability information of the terminal device is used to indicate whether the terminal device supports the SSC mode 3 of the Non-IP session, and the DN authentication information is used to indicate a session type of a PDU session supported by a DN and an associated SSC mode; and determine, based on the determining information, that the requested SSC mode is not supported.

In a possible design, the first response message includes a cause code about a rejection to establish the first PDU session.

In a possible design: if the processing module determines, based on the subscription information of the terminal device, that the requested SSC mode is not supported, the cause code indicates that a subscription does not support the requested SSC mode; or if the processing module determines, based on the network capability information, that the requested SSC mode is not supported, the cause code indicates that the network does not support the requested SSC mode; or if the processing module determines, based on the DN authentication information, that the requested SSC mode is not supported, the cause code indicates that the DN does not support the requested SSC mode; or if the processing module determines, based on the capability information of the terminal device, that the requested SSC mode is not supported, the cause code indicates that the terminal device does not support the requested SSC mode.

In a possible design, the first core network element is an AMF network element or an SMF network element. Additionally, the processing module is further configured to: obtain first SSC mode limitation information, where the first SSC mode limitation information is determined based on subscription information of the terminal device, network capability information, and capability information of the terminal device; and determine, based on the first SSC mode limitation information, that the requested SSC mode is not supported.

According to a seventh aspect, an embodiment of this application provides an apparatus. The apparatus has a function of implementing the terminal device in the foregoing fifth aspect. The function may be implemented by hardware by executing corresponding software. In a possible design, the apparatus includes a processor, a transceiver, and a memory. The memory is configured to store a computer-executable instruction. The transceiver is configured to implement communication between the apparatus and another communications entity. The processor is connected to the memory using the bus. When the apparatus runs, the processor executes the computer-executable instruction stored in the memory, such that the apparatus performs the method for determining an SSC mode in the foregoing first aspect.

For example, the processor is configured to determine a requested SSC mode, and the transceiver is configured to send a first request message to a first core network element, where the first request message is used to request to establish a first PDU session, and the first request message includes a session type of the first PDU session and the requested SSC mode.

In a possible design, the first request message further includes first indication information, and the first indication information is used to indicate that the requested SSC mode is not allowed to be modified.

In a possible design, before the processor determines the requested SSC mode, the transceiver is further configured to: send capability information of the terminal device to a second core network element, where the capability information of the terminal device is used to indicate whether the terminal device supports an SSC mode 3 of a Non-IP session; and receive first SSC mode limitation information from the second core network element, where the first SSC mode limitation information is determined based on the capability information of the terminal device, subscription information of the terminal device, and network capability information, the subscription information is used to indicate a session type and an associated SSC mode that are allowed for a PDU session of the terminal device, and the network capability information is used to indicate whether a network supports the SSC mode 3 of the Non-IP session. Additionally, the processor is configured to determine the requested SSC mode based on the session type of the first PDU session and the first SSC mode limitation information.

In a possible design, the transceiver is further configured to receive first SSC mode limitation information from a third core network element, where the first SSC mode limitation information is determined based on capability information of the terminal device, subscription information of the terminal device, network capability information, and an AF policy, the capability information of the terminal device is used to indicate whether the terminal device supports an SSC mode 3 of a Non-IP session, the subscription information is used to indicate a session type and an associated SSC mode that are allowed for a PDU session of the terminal device, the network capability information is used to indicate whether a network supports the SSC mode 3 of the Non-IP session, and the AF policy includes at least one application identity and an associated SSC mode. Additionally, the processor is configured to determine the requested SSC mode based on the application identity, the session type of the first PDU session, and the first SSC mode limitation information.

In a possible design, the requested SSC mode is a unique SSC mode that meets the first SSC mode limitation information.

In a possible design, the processor is configured to: use, as the requested SSC mode, an SSC mode provided by an application program; or obtain the requested SSC mode according to a default SSC mode selection policy rule.

In a possible design, after sending the first request message to the first core network element, the transceiver is further configured to receive a first response message from the first core network element, where the first response message is used to indicate that establishment of the first PDU session is rejected.

In a possible design, the first response message includes a cause code about the rejection to establish the first PDU session, and the cause code is used to indicate at least one of the following: the terminal device does not support the requested SSC mode; the network does not support the requested SSC mode; a data network DN does not support the requested SSC mode; or a subscription does not support the requested SSC mode.

In a possible design, the processor is further configured to: if the cause code is used to indicate that the terminal device does not support the requested SSC mode and/or that the subscription does not support the requested SSC mode, determine the requested SSC mode as an SSC mode that is not associated with the session type of the first PDU session; or if the cause code is used to indicate that the network does not support the requested SSC mode, determine, when an accessed PLMN does not change, the requested SSC mode as an SSC mode that is not associated with the session type of the first PDU session; or if the cause code is used to indicate that the DN does not support the requested SSC mode, determine, when a DNN does not change, the requested SSC mode as an SSC mode that is not associated with the session type of the first PDU session.

According to an eighth aspect, an embodiment of this application provides an apparatus. The apparatus has a function of implementing the core network element in the foregoing sixth aspect. The function may be implemented by hardware by executing corresponding software. In a possible design, the apparatus includes a processor, a transceiver, and a memory. The memory is configured to store a computer-executable instruction. The transceiver is configured to implement communication between the apparatus and another communications entity. The processor is connected to the memory using the bus. When the apparatus runs, the processor executes the computer-executable instruction stored in the memory, such that the apparatus performs the method for determining an SSC mode in the foregoing second aspect, third aspect, or fourth aspect.

In an example of implementing the method for determining an SSC mode in the foregoing second aspect, the transceiver is configured to receive a first request message from a terminal device, where the first request message includes a session type of a first PDU session and a requested SSC mode. Additionally, the transceiver is configured to return a first response message to the terminal device.

In a possible design, the first request message further includes first indication information, and the first indication information is used to indicate that the requested SSC mode is not allowed to be modified.

In a possible design, the first response message is used to indicate that the requested SSC mode is rejected.

In a possible design, the processor is configured to: obtain determining information, where the determining information includes one or more of subscription information of the terminal device, network capability information, DN authentication information, or capability information of the terminal device, the subscription information is used to indicate a session type and an associated SSC mode that are allowed for a PDU session of the terminal device, the network capability information is used to indicate whether a network supports an SSC mode 3 of a Non-IP session, the capability information of the terminal device is used to indicate whether the terminal device supports the SSC mode 3 of the Non-IP session, and the DN authentication information is used to indicate a session type of a PDU session supported by a DN and an associated SSC mode; and determine, based on the determining information, that the requested SSC mode is not supported.

In a possible design, the first response message includes a cause code about a rejection to establish the first PDU session.

In a possible design: if the processor determines, based on the subscription information of the terminal device, that the requested SSC mode is not supported, the cause code indicates that a subscription does not support the requested SSC mode; or if the processor determines, based on the network capability information, that the requested SSC mode is not supported, the cause code indicates that the network does not support the requested SSC mode; or if the processor determines, based on the DN authentication information, that the requested SSC mode is not supported, the cause code indicates that the DN does not support the requested SSC mode; or if the processor determines, based on the capability information of the terminal device, that the requested SSC mode is not supported, the cause code indicates that the terminal device does not support the requested SSC mode.

In a possible design, the first core network element is an AMF network element or an SMF network element. Additionally, the processor is further configured to: obtain first SSC mode limitation information, where the first SSC mode limitation information is determined based on subscription information of the terminal device, network capability information, and capability information of the terminal device; and determine, based on the first SSC mode limitation information, that the requested SSC mode is not supported.

Still another aspect of the embodiments of this application provides a communications device. The communications device includes: a memory configured to store a software program; and a processor configured to read the software program in the memory and perform the method for determining an SSC mode in any one of the first aspect to the fourth aspect.

Still another aspect of the embodiments of this application provides a computer-readable storage medium. The storage medium stores a software program. When the software program is read and executed by one or more processors, the method for determining an SSC mode in any one of the first aspect to the fourth aspect is implemented.

Still another aspect of the embodiments of this application provides a chip, including a processor and a transceiver component. Optionally, the chip further includes a memory. The chip is configured to perform the method for determining an SSC mode in any one of the first aspect to the fourth aspect.

DESCRIPTION OF EMBODIMENTS

The following describes this application with reference to accompanying drawings in this specification.

Figure 1:
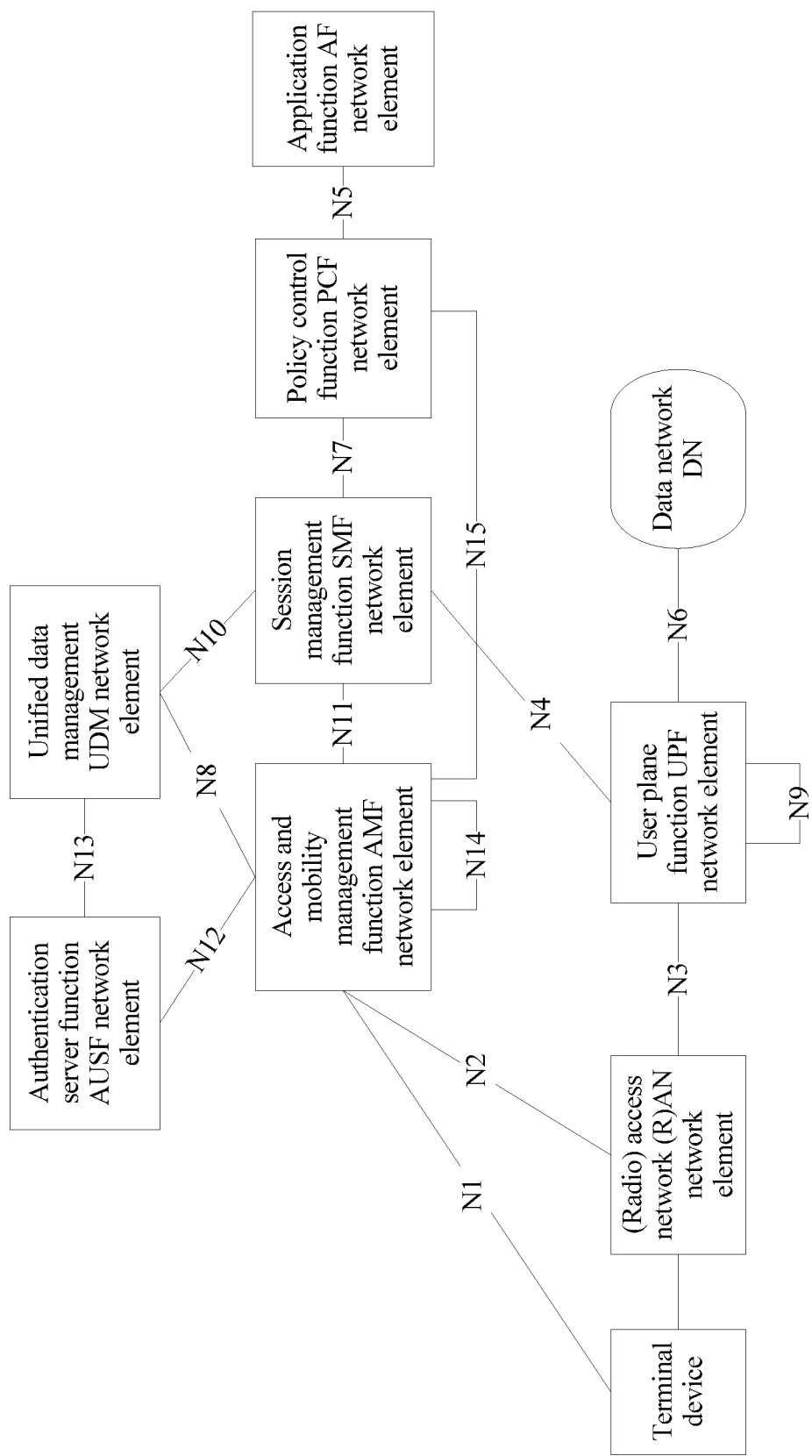
FIG. 1 is a schematic diagram of a network architecture to which an embodiment of this application is applicable.

FIG. 1 is a schematic diagram of a network architecture to which an embodiment of this application is applicable. As shown in FIG. 1, the network architecture includes a terminal device, a (radio) access network ((R)AN) network element, a user plane function (UPF) network element, an access and mobility management function (AMF) network element, a session management function (SMF) network element, a policy control function (PCF) network element, an application function (AF) network element, an authentication server function (AUSF) network element, a unified data management (UDM) network element, and a data network (DN) network element.

The (R)AN network element and the UPF network element are logically interconnected using an N3 interface. The DN network element and the UPF network element are logically interconnected using an N6 interface. The terminal device and the AMF network element are logically interconnected using an N1 interface. The (R)AN network element and the AMF network element are logically interconnected using an N2 interface. An SMF network element and the UPF network element are logically interconnected using an N4 interface.

To facilitate understanding of this application, the following describes main functions of some devices or network elements that may be involved in this application.

The terminal device is a device with a wireless sending/receiving function. The terminal device may be deployed on land and includes an indoor or outdoor device, a handheld device, or a vehicle-mounted device, or may be deployed on the water (for example, a ship), or may be deployed in the air (for example, an airplane, a balloon, or a satellite). The terminal device may be a user equipment (UE), a mobile phone, a tablet computer (pad), a computer with a wireless sending/receiving function, a virtual reality (VR) terminal, an augmented reality (AR) terminal, a wireless terminal in industrial control, a wireless terminal in self driving, a wireless terminal in remote medical), a wireless terminal in a smart grid, a wireless terminal in transportation safety, a wireless terminal in a smart city, a wireless terminal in a smart home, or the like.

The (R)AN network element provides the terminal device with a wireless connection to ensure reliable transmission of uplink/downlink data of the terminal device, and so on. The (R)AN network element may be a next generation NodeB (gNB) in a 5G system, or may be a base transceiver station (BTS) in a Global System for Mobile Communications (GSM) or code division multiple access (CDMA) system, or may be a NodeB (NB) in a wideband CDMA (WCDMA) system, or may be an evolved NodeB (eNB or eNodeB) in a Long-Term Evolution (LTE) system.

The AMF network element is responsible for access management and mobility management of the terminal device. During actual application, the AMF network element includes a mobility management function of a mobility management entity (MME) in a network framework of LTE, and additionally includes an access management function. Main functions of the AMF entity include a termination point of a radio access network control plane, a termination point of non-access signaling, mobility management, lawful interception, access authorization/authentication, and the like.

Main functions of the SMF network element include session management, Internet Protocol (IP) address allocation and management of the terminal device, a manageable-user-plane selection function, a termination point of a policy control and charging function interface, downlink data notification, and the like. The session management function of the SMF network element may include a session management function of a mobility management entity (MME), or include a control plane function of a serving gateway (SGW) and a public data network (PDN) gateway (PDN-GW) in LTE.

A main function of the PCF network element is policy control execution. Similar to a policy and charging rules function (PCRF) network element in LTE, the PCF network element is mainly responsible for policy authorization, quality of service, and charging rule generation, and delivers a corresponding rule to the UPF network element using the SMF network element, to complete installation of a corresponding policy and rule.

The AF network element: The AF network element may be a third-party application control platform, or may be a device of an operator. The AF network element may provide services for a plurality of application servers. For example, in this application, the AF entity may receive a request message from an application server, and provide a related terminal application (that is, a service provided by the application server) with an SSC mode selection policy.

The UPF network element is used for packet routing and forwarding, quality of service (QoS) processing of user plane data, and the like.

Main functions of the AUSF network element include user authentication and the like. The UDM network element is configured to store subscription data of a mobile subscriber.

The DN network element provides the terminal device with a service. A DN may include a plurality of types of different application servers, and may provide the terminal device with different application services, such as an internet network.

For the foregoing network elements, it should be noted that a network including all the operator network elements except the RAN network element is referred to as a core network (CN). In a 5G network, the CN includes network elements such as the AMF network element, the SMF network element, the UPF network element, the UDM network element, and the PCF network element.

Figure 2:
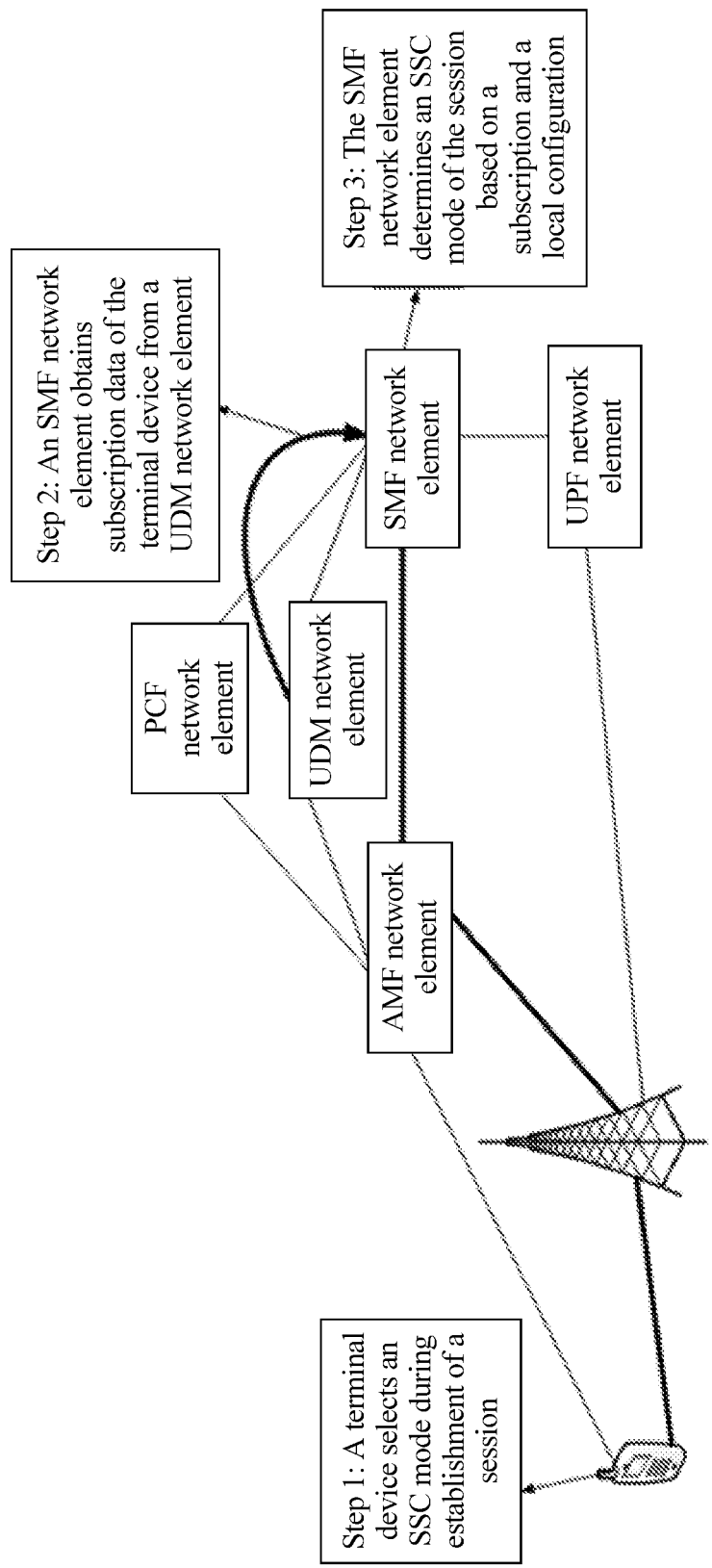
FIG. 2 is a schematic flowchart of selecting an SSC mode for a session.

In this application, the foregoing mentioned network elements may be physical entity network elements or virtual network elements. This is not limited herein. Based on the foregoing network architecture, a procedure for determining an SSC mode is shown in FIG. 2. An Ethernet session is used as an example. The procedure includes the following steps.

Step 1: A terminal device selects an SSC mode during establishment of a session. For example, the SSC mode may be selected according to an SSC mode selection policy (SSCMSP) rule. The SSC mode selection policy rule may be a non-default SSC mode selection policy (non-Default SSCMSP) rule that conforms to an application, or a default SSC mode selection policy (Default SSCMSP). After selecting the SSC mode, if the terminal device determines that there is a corresponding SSC mode session that can be reused, the terminal device reuses the session; or if the terminal device determines that there is no corresponding SSC mode session that can be reused, the terminal device creates a session. If there is neither the non-default SSC mode selection policy rule that conforms to the application nor the default SSC mode selection policy rule, a network subsequently determines an SSC mode.

Step 2: An SMF network element obtains subscription data of the terminal device from a UDM network element, where the subscription data includes an allowed PDU session type and allowed SSC mode of the terminal device, or a default PDU session type and default SSC mode of the terminal device.

Step 3: The SMF network element determines an SSC mode of the session based on a subscription and a local configuration. If the terminal device provides a requested SSC mode, the SMF network element checks whether the requested SSC mode is allowed. If the requested SSC mode is allowed, the SMF network element returns a response message indicating that the requested SSC mode is supported. If the requested SSC mode is not allowed, the SMF network element may modify/reject the session and add a cause. If the terminal device provides no SSC mode, the SMF network element can set the SSC mode of the session to a default SSC mode. If the SMF network element assigns a static IP address to the session, the SSC mode of the session can be set to an SSC mode 1.

A new limitation (an SSC mode 3 can be used in neither the Ethernet session nor an unstructured session) appearing in the 5G network and two types of UEs and 5GCs that may appear are not considered in the process of selecting the SSC mode for the session. Therefore, an error may occur in the process of determining the SSC mode.

Based on this, embodiments of this application provide a method for determining an SSC mode, to resolve a technical problem that an error may occur in determining an SSC mode in the foregoing method.

In the following embodiments, step numbers are merely for ease of description, and there is no strict execution sequence relationship between steps.

Embodiment 1

Figure 3:
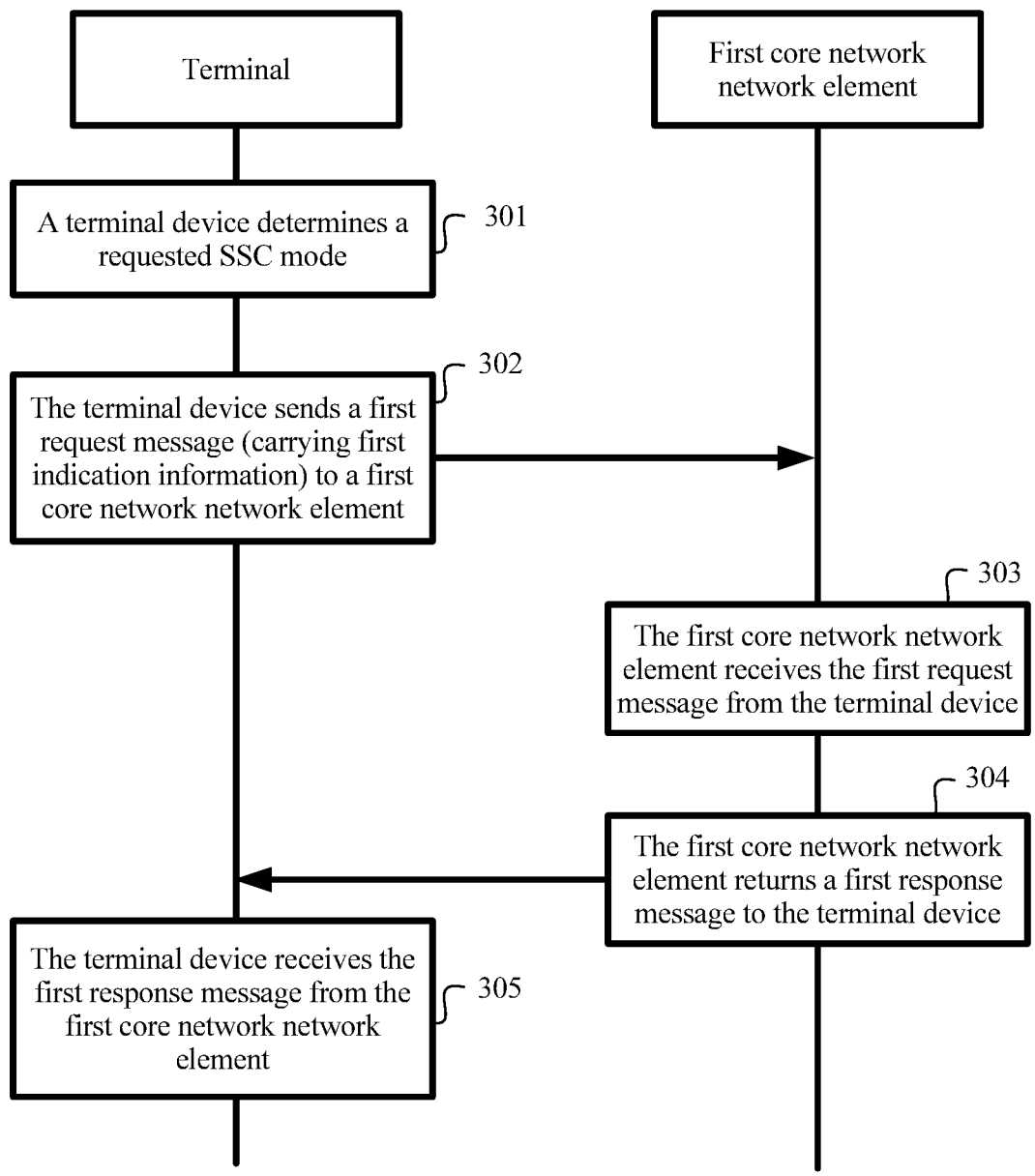
FIG. 3 is a schematic flowchart corresponding to a method for determining an SSC mode according to Embodiment 1 of this application.

FIG. 3 is a schematic flowchart corresponding to a method for determining an SSC mode according to Embodiment 1 of this application. As shown in FIG. 3, the method includes the following steps.

Step 301: A terminal device determines a requested SSC mode.

Step 302: The terminal device sends a first request message to a first core network element, where the first request message is used to request to establish a first PDU session, and the first request message includes a session type of the first PDU session and the requested SSC mode.

Herein, the first core network element may be an SMF network element. It should be noted that the terminal device may send the first request message to the first core network element using another device, for example, an AMF network element. This application imposes no limitation on whether the terminal device directly or indirectly sends the first request message to the first core network element. The first request message may further include first indication information, and the first indication information is used to indicate that the requested SSC mode is not allowed to be modified. Further, the terminal device may add the first indication information to the first request message when determining that the requested SSC mode is a unique SSC mode supported by the terminal device or in another setting case, to prevent a network-side network element from subsequently making an erroneous decision, for example, modifying the requested SSC mode to another SSC mode that is not supported by the terminal device.

The terminal device may determine the requested SSC mode in a plurality of manners. In a possible implementation, the terminal device sends capability information of the terminal device to a second core network element, where the capability information of the terminal device is used to indicate whether the terminal device supports an SSC mode 3 of a Non-IP session, and the non-IP session may include an Ethernet session and/or an unstructured session. The second core network element obtains first SSC mode limitation information based on one or more of the capability information of the terminal device, subscription information of the terminal device, or network capability information, and returns the first SSC mode limitation information to the terminal device, where the subscription information is used to indicate a session type and an associated SSC mode that are allowed for a PDU session of the terminal device, and the network capability information is used to indicate whether a network supports the SSC mode 3 of the Non-IP session. Then the terminal device may determine the requested SSC mode based on the first SSC mode limitation information and the session type of the first PDU session. In this implementation, the second core network element may be an AMF network element.

In another possible implementation, the terminal device receives first SSC mode limitation information from a third core network element, where the first SSC mode limitation information is determined based on capability information of the terminal device, subscription information of the terminal device, network capability information, and an AF policy, and the AF policy includes at least one application identity and an associated SSC mode. Then the terminal device may determine the requested SSC mode based on the application identity, the session type of the first PDU session, and the first SSC mode limitation information. In this implementation, the third core network element may be a PCF network element.

The first SSC mode limitation information is determined in full consideration of a plurality of dimensions of information, such that the first SSC mode limitation information is more proper and effective. In this way, if the terminal device determines, based on the first SSC mode limitation information, that the requested SSC mode is a unique SSC mode associated with the session type of the first PDU session, in other words, the requested SSC mode is a unique SSC mode that meets the first SSC mode limitation information, the terminal device may indicate, using the first indication information, that the requested SSC mode is not allowed to be modified, to prevent a network-side network element from subsequently making an erroneous decision.

In the foregoing two implementations, for a detailed implementation procedure in which the AMF network element or the PCF network element obtains the first SSC mode limitation information, refer to subsequent embodiments.

In still another possible implementation, the terminal device uses, as the requested SSC mode, an SSC mode provided by an application program. Alternatively, the terminal device obtains the requested SSC mode according to a default SSC mode selection policy rule, or the terminal device may determine the requested SSC mode in another manner. This is not specifically limited.

In this embodiment of this application, the first request message may carry the first indication information in the following several cases: (1) The requested SSC mode is the unique SSC mode supported by the terminal device. (2) The requested SSC mode is the unique SSC mode that meets the first SSC mode limitation information. (3) The requested SSC mode is provided by the application program. (4) The requested SSC mode is obtained according to the default SSC mode selection policy rule. It should be noted that the foregoing describes only some possible cases in which the first request message carries the first indication information. This is not specifically limited.

Step 303: The first core network element receives the first request message from the terminal device.

Step 304: The first core network element returns a first response message to the terminal device.

Further, the first response message may be used to indicate that establishment of the first PDU session is rejected. For example, the first core network element obtains determining information. The determining information includes one or more of the subscription information of the terminal device, the network capability information, DN authentication information, or the capability information of the terminal device. The subscription information is used to indicate a session type and an associated SSC mode that are allowed for a PDU session of the terminal device. The network capability information is used to indicate whether the network supports the SSC mode 3 of the Non-IP session. The capability information of the terminal device is used to indicate whether the terminal device supports the SSC mode 3 of the Non-IP session. The DN authentication information is used to indicate a session type of a PDU session supported by a data network and an associated SSC mode, or is used to indicate whether the data network supports the SSC mode requested by the terminal device. Then, after determining, based on the determining information, that the SSC mode requested by the terminal device is not supported, the first core network element returns the first response message to the terminal device.

The first response message may further include a cause code about the rejection to establish the first PDU session. The cause code is used to indicate one or more of the following: the terminal device does not support the requested SSC mode; the network does not support the requested SSC mode; the DN does not support the requested SSC mode; or a subscription does not support the requested SSC mode.

If the first core network element determines, based on the capability information of the terminal device, that the requested SSC mode is not supported, the cause code indicates that the terminal device does not support the requested SSC mode. For example, the session type of the first PDU session is the Non-IP session, the requested SSC mode is the SSC mode 3, and the capability information of the terminal device indicates that the terminal device does not support the SSC mode 3 of the Non-IP session, and therefore it is determined that the requested SSC mode is not supported. If the first core network element determines, based on the subscription information of the terminal device, that the requested SSC mode is not supported, the cause code indicates that the subscription does not support the requested SSC mode. If the first core network element determines, based on the network capability information, that the requested SSC mode is not supported, the cause code indicates that the network does not support the requested SSC mode. If the first core network element determines, based on the DN authentication information, that the requested SSC mode is not supported, the cause code indicates that the DN does not support the requested SSC mode.

The first response message may further include an allowed SSC mode of the first PDU session.

Step 305: The terminal device receives the first response message from the first core network element.

Further, after receiving the first response message, the terminal device may attempt to use a different session type or a different SSC mode. For example, if the cause code is used to indicate that the terminal device does not support the requested SSC mode and/or the subscription does not support the requested SSC mode, the terminal device determines the requested SSC mode as an SSC mode that is not associated with the session type of the first PDU session. Subsequently, the terminal device does not select this SSC mode for a PDU session of the same type. If the cause code is used to indicate that the network does not support the requested SSC mode, the terminal device determines, when an accessed public land mobile network (PLMN) does not change, the requested SSC mode as an SSC mode that is not associated with the session type of the first PDU session. After the PLMN changes, the terminal device may continue to attempt to select this SSC mode for a PDU session of the same type. If the cause code is used to indicate that the DN does not support the requested SSC mode, the terminal device determines, when a data network name (DNN) does not change, the requested SSC mode as an SSC mode that is not associated with the session type of the first PDU session. After the DNN changes, the terminal device may continue to attempt to select this SSC mode for a PDU session of the same type.

If the first response message includes the allowed SSC mode of the first PDU session, the terminal device may send a fourth request message to the first core network element based on the first response message, where the fourth request message includes the allowed SSC mode of the first PDU session. That is, the terminal device may attempt again to establish the first PDU session based on the allowed SSC mode of the first PDU session.

In this embodiment of this application, the first request message sent by the terminal device to the first core network element may carry the first indication information, used to indicate that the SSC mode requested by the terminal device is not allowed to be modified, to prevent a network-side network element from subsequently making an erroneous decision. Further, the SSC mode requested by the terminal device may be obtained by the terminal device based on the first SSC mode limitation information. The first SSC mode limitation information is determined in full consideration of a plurality of dimensions of information. As such, the terminal device can determine whether the requested SSC mode is allowed to be modified, and add the first indication information to the first request message if the requested SSC mode is not allowed to be modified.

It should be noted that, in the foregoing embodiment, the SMF network element determines whether the SSC mode requested by the terminal device is supported. In another possible embodiment, the AMF network element may alternatively determine whether the SSC mode requested by the terminal device is supported.

With reference to embodiments, the following describes a plurality of possible implementation procedures of determining an SSC mode that are provided in this application.

Embodiment 2

Figure 4A:
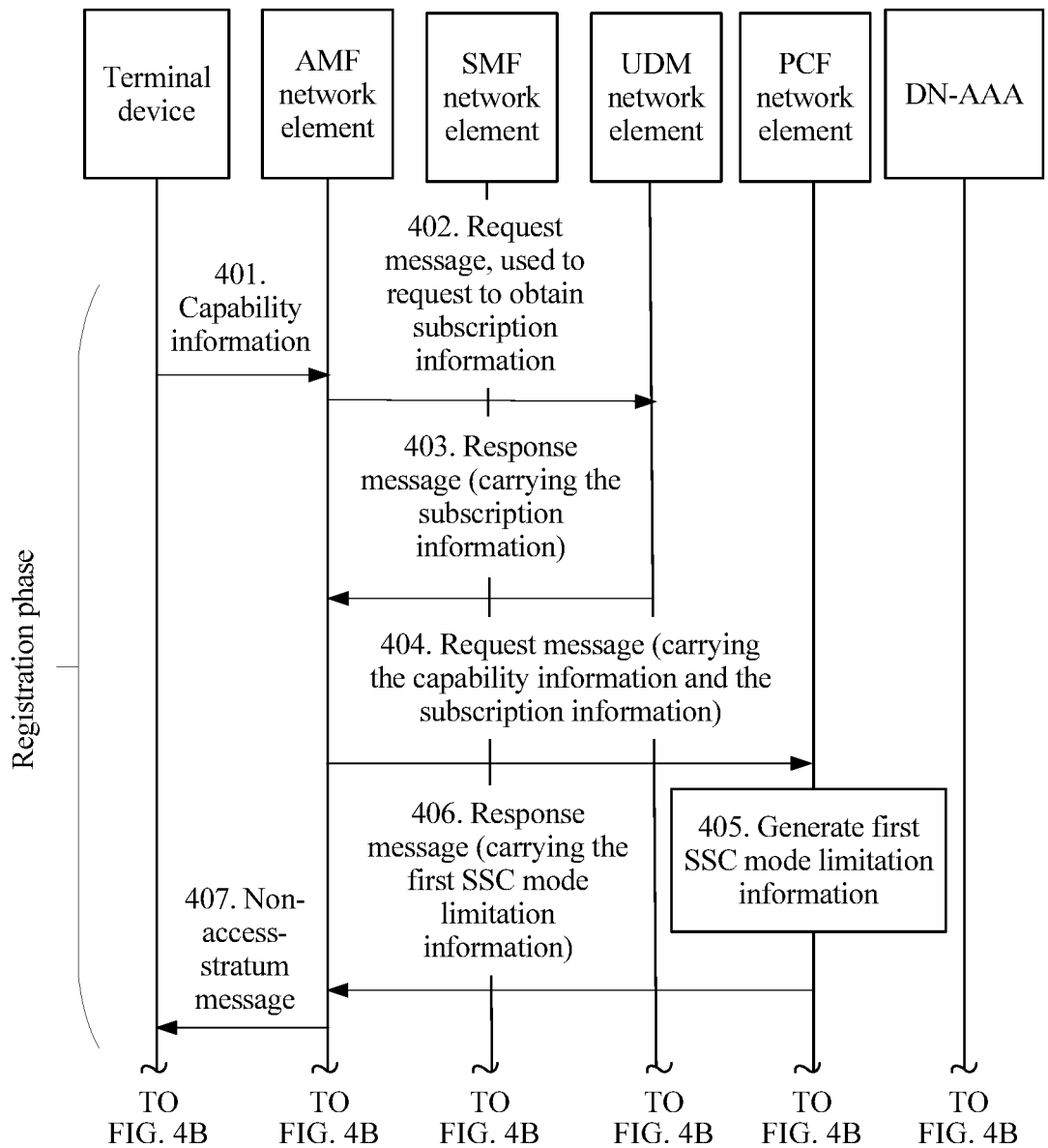
FIG. 4A and FIG. 4B are schematic flowcharts corresponding to a method for determining an SSC mode according to Embodiment 2 of this application.
Figure 4B:
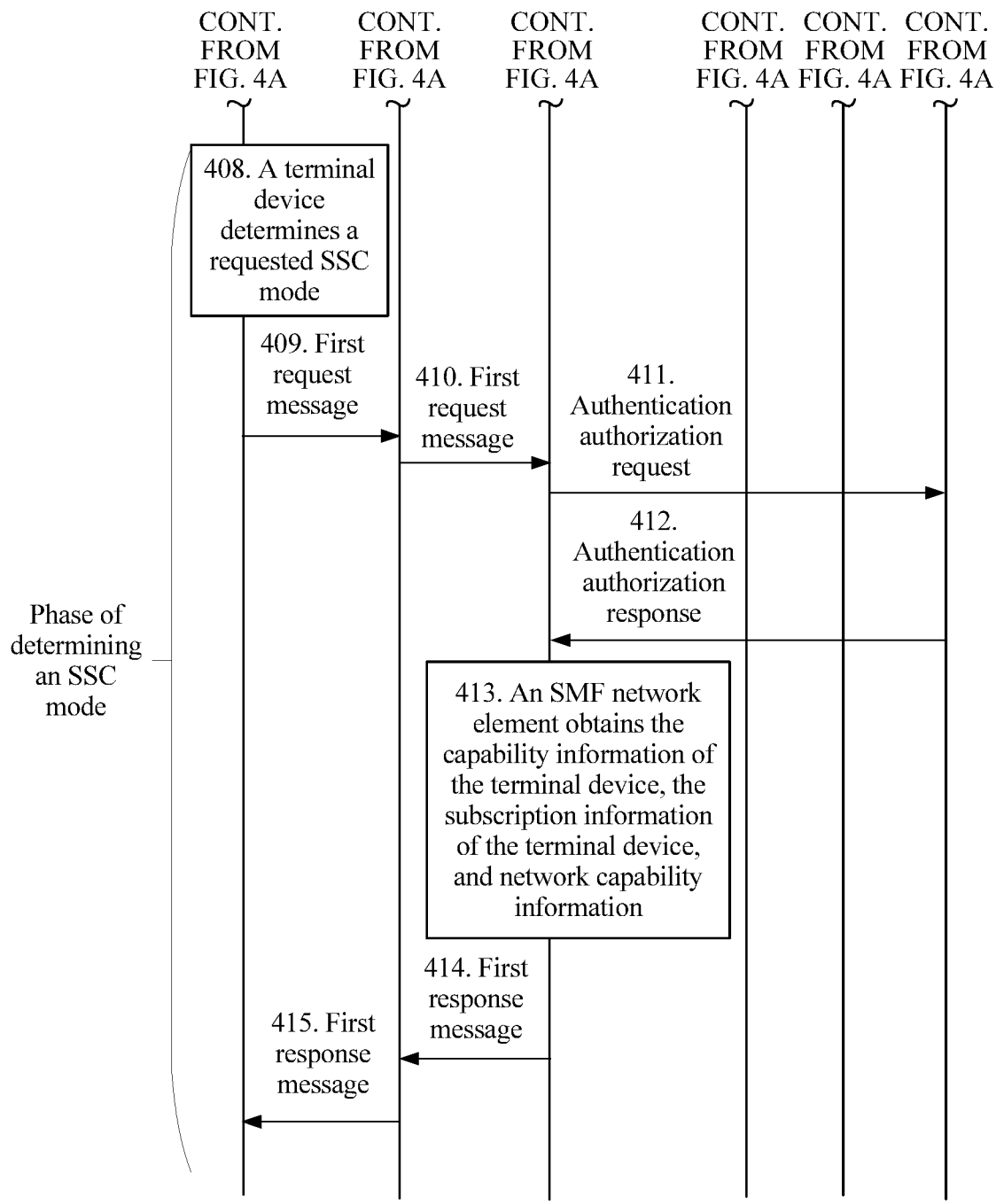

FIG. 4A and FIG. 4B are schematic flowcharts corresponding to a method for determining an SSC mode according to Embodiment 2 of this application. As shown in FIG. 4A and FIG. 4B, the method includes the following steps.

Step 401: A terminal device sends capability information of the terminal device to an AMF network element.

Herein, the capability information of the terminal device is used to indicate whether the terminal device supports an SSC mode 3 of a Non-IP session. The Non-IP session may include an Ethernet session and/or an unstructured session.

The terminal device may send a registration request message to the AMF network element, where the registration request message may include an identity of the terminal device and the capability information of the terminal device.

Step 402: After receiving the capability information of the terminal device, the AMF network element sends a request message (Nudm_SDM_Get/Nudm_SDM_Subscribe) to a UDM network element, to request to obtain subscription information of the terminal device. Herein, the request message includes the identity of the terminal device.

Step 403: The UDM network element sends a response message (Nudm_SDM_Get Response/Nudm_SDM_Notification) to the AMF network element.

Herein, the response message may include the subscription information of the terminal device. The subscription information is used to indicate a session type and an associated SSC mode that are allowed for a PDU session of the terminal device, or a session type of a default PDU session of the terminal device and an associated SSC mode.

The response message may further include local breakout (LBO) indication information, used to indicate whether the terminal device is allowed to use an LBO session in an accessed PLMN network.

Step 404: After receiving the response message returned by the UDM network element, the AMF network element may send a request message (Npcf_AMPolicyControl_Get) to a PCF network element.

Herein, the request message may include the capability information of the terminal device and the subscription information of the terminal device, and may further include the LBO indication information.

Step 405: After receiving the request message sent by the AMF network element, the PCF network element may generate first SSC mode limitation information based on the capability information of the terminal device, the subscription information of the terminal device, network capability information, and an AF policy. The network capability information is used to indicate whether a network supports the SSC mode 3 of the Non-IP session, and the AF policy includes at least one application identity and an associated SSC mode.

In a case, the PCF network element is a home PCF (H-PCF) network element, and therefore the H-PCF generates the first SSC mode limitation information based on capability information of a home network, the capability information of the terminal device, the subscription information of the terminal device, and the AF policy. In another case, the PCF network element is a visited PCF (V-PCF) network element. If the LBO indication information indicates that LBO is allowed to be used, the V-PCF generates the first SSC mode limitation information based on a capability information of a visited network, the capability information of the terminal device, the subscription information of the terminal device, and the AF policy. Alternatively, if the LBO indication information indicates that LBO is not allowed to be used, the V-PCF network element sends information to an H-PCF network element, and the H-PCF generates the first SSC mode limitation information based on a capability information of a home network, the capability information of the terminal device, the subscription information of the terminal device, and the AF policy.

Herein, the first SSC mode limitation information is an SSCMSP rule, and may include an application identity (App ID), a session type of a PDU session, and an associated SSC mode. The first SSC mode limitation information indicates a session type of a PDU session and an associated SSC mode that are corresponding to the application identity. Table 1 shows an example of the SSCMSP rule.

TABLE 1

Example of the SSCMSP rule

| Application identity | Session type of a PDU session | Associated SSC mode |
| --- | --- | --- |
| Application 1 | Ethernet session | SSC mode 3 |
|  | Unstructured session | SSC mode 2 and SSC mode 3 |
| Application 2 | Ethernet session | SSC mode 2 and SSC mode 3 |
|  | IP session | SSC mode 3 |
| . . . | . . . | . . . |
| Application n | Ethernet session | SSC mode 3 |

In Table 1, a session type that is of a PDU session and that corresponds to the application 1 includes the Ethernet session and the unstructured session, an SSC mode associated with the Ethernet session includes the SSC mode 3, and an SSC mode associated with the unstructured session includes the SSC mode 2 and the SSC mode 3. A session type that is of a PDU session and that corresponds to the application 2 includes the Ethernet session and the IP session, an SSC mode associated with the Ethernet session includes the SSC mode 2 and the SSC mode 3, and an SSC mode associated with the IP session includes the SSC mode 3. A session type that is of a PDU session and that corresponds to the application n includes the Ethernet session, and an SSC mode associated with the Ethernet session includes the SSC mode 3.

It should be noted that the PCF network element may update the first SSC mode limitation information. For example, the PCF network element may update the first SSC mode limitation information according to a specified period, or update the first SSC mode limitation information when determining that the first SSC mode limitation information changes. This is not specifically limited.

Step 406: The PCF network element returns a response message (Npcf_AMPolicyControl_Get Response/Npcf_AMPolicyControl_UpdateNotify) to the AMF network element, where the response message includes the first SSC mode limitation information.

Step 407: After receiving the first SSC mode limitation information sent by the PCF network element, the AMF network element sends the first SSC mode limitation information to the terminal device.

For example, the AMF network element may send the first SSC mode limitation information to the terminal device using a non-access-stratum (NAS) message.

Step 408: The terminal device determines a requested SSC mode (namely, an available SSC mode of a first PDU session).

In some cases, the terminal device may determine the requested SSC mode based on the first SSC mode limitation information, the application identity, and a session type of the first PDU session. In an example, referring to the foregoing Table 1, the terminal device establishes a first PDU session of the application 1, and a session type of the first PDU session is the Ethernet session, and therefore the terminal device can determine that the requested SSC mode is the SSC mode 3.

Step 409: The terminal device sends a first request message to the AMF network element.

Step 410: The AMF network element forwards the first request message to an SMF network element.

Herein, the first request message includes the session type of the first PDU session and the requested SSC mode. Further, in the foregoing example, because only one SSC mode, namely, the SSC mode 3, is associated with the session type of the first PDU session, the first request message may further include first indication information, used to indicate that the requested SSC mode is not allowed to be modified, to effectively prevent the SMF network element from subsequently modifying the requested SSC mode to another SSC mode that is not supported by the terminal device.

In this embodiment of this application, the AMF network element may further send the capability information of the terminal device to the SMF network element.

Step 411: After receiving the first request message, the SMF network element sends an authentication authorization request to a data network authentication-authorization-accounting (DN-AAA) server, where the authentication authorization request may include DN authentication authorization information (that is, a session type of the first PDU session and the requested SSC mode), and may further include a PLMN (that is, a PLMN in which the SMF network element is located).

Step 412: The SMF network element receives an authentication authorization response message from the DN-AAA, where the authentication authorization response message includes DN authentication information. The DN authentication information is used to indicate a session type of a PDU session supported by a DN and an associated SSC mode (that is, SSC mode limitation information of the DN-AAA for the PLMN in which the SMF is located), or is used to indicate whether the DN supports the SSC mode requested by the terminal device. In this embodiment of this application, descriptions are provided using an example in which the DN authentication information is used to indicate the session type of the PDU session supported by the DN and the associated SSC mode.

Step 413: The SMF network element obtains the capability information of the terminal device, the subscription information of the terminal device, and the network capability information.

Herein, the network capability information may be preconfigured. The SMF network element may obtain the capability information of the terminal device from the AMF network element. Details are not described. The SMF network element may obtain the subscription information of the terminal device from the UDM network element. Details are not described.

Step 414: The SMF network element returns a first response message to the AMF network element.

Herein, the SMF network element may determine, based on determining information, whether the requested SSC mode is supported. If the SMF network element determines that the requested SSC mode is not supported, because the first indication information indicates that the requested SSC mode is not allowed to be modified, the SMF network element may return, to the AMF network element, the first response message, used to indicate that the SSC mode requested by the terminal device is rejected. The determining information includes one or more of the capability information of the terminal device, the subscription information of the terminal device, the network capability information, or the DN authentication information.

Further, the first response message may include a cause code about the rejection of the SSC mode requested by the terminal device. If the SMF network element determines, based on the subscription information of the terminal device, that the requested SSC mode is not supported, the cause code indicates that a subscription does not support the requested SSC mode. If the SMF network element determines, based on the network capability information, that the requested SSC mode is not supported, the cause code indicates that the network does not support the requested SSC mode. If the SMF network element determines, based on the DN authentication information, that the requested SSC mode is not supported, the cause code indicates that the DN does not support the requested SSC mode. If the SMF network element determines, based on the capability information of the terminal device, that the requested SSC mode is not supported, the cause code indicates that the terminal device does not support the requested SSC mode. It should be noted that the cause code may be alternatively used to indicate two or more of the following: the DN does not support the requested SSC mode, the network does not support the requested SSC mode, the terminal device does not support the requested SSC mode, or the subscription does not support the requested SSC mode. This is not specifically limited.

For example, the session type of the first PDU session is the Ethernet session, and the SSC mode requested by the terminal device is the SSC mode 3.

Case 1: The capability information of the terminal device is used to indicate that the terminal device does not support the SSC mode 3 of the Non-IP session, and all the other three items support the SSC mode 3 of the Non-IP session. In this case, the cause code indicates that the terminal device does not support the requested SSC mode.

Case 2: The capability information of the terminal device is used to indicate that the terminal device supports the SSC mode 3 of the Non-IP session, the network capability information is used to indicate that the network does not support the SSC mode 3 of the Non-IP session, and both the other two items support the SSC mode 3 of the Non-IP session. In this case, the cause code indicates that the network does not support the requested SSC mode.

Case 3: The capability information of the terminal device is used to indicate that the terminal device supports the SSC mode 3 of the Non-IP session, the network capability information is used to indicate that the network supports the SSC mode 3 of the Non-IP session, the subscription information of the terminal device is used to indicate that the terminal device allows the SSC mode 3 of the Non-IP session, and the DN authentication information is used to indicate that the DN does not support the SSC mode 3 of the Non-IP session. In this case, the cause code indicates that the DN does not support the requested SSC mode.

Case 4: The capability information of the terminal device is used to indicate that the terminal device does not support the SSC mode 3 of the Non-IP session, the network capability information is used to indicate that the network does not support the SSC mode 3 of the Non-IP session, and the other two items support the SSC mode 3 of the Non-IP session. In this case, the cause code can indicate that the terminal device does not support the requested SSC mode and that the network does not support the requested SSC mode.

Further, the SMF network element may further determine an allowed SSC mode of the first PDU session, and then return the allowed SSC mode of the first PDU session to the terminal device using the first response message. That is, the first response message may further include the allowed SSC mode of the first PDU session.

It should be noted that, in step 414, if the SMF network element determines that the SSC mode requested by the terminal device is supported, the SMF network element may return a first response message used to indicate that establishment of the first PDU session is supported. In this embodiment of this application, only the rejection case is described, and the support case is not described in detail.

Step 415: The AMF network element sends the first response message to the terminal device.

Further, after the terminal device receives the first response message, if the first response message is used to indicate that establishment of the first PDU session is rejected, the terminal device may attempt to use another type of PDU session or another SSC mode. For details, refer to the descriptions in Embodiment 1. Details are not described herein again. If the first response message is used to indicate that establishment of the first PDU session is supported, the terminal device may perform a subsequent procedure of establishing the first PDU session. For details, refer to other approaches. Details are not described herein.

If the first response message includes the allowed SSC mode of the first PDU session, the terminal device may send a fourth request message to a first core network element based on the first response message, where the fourth request message includes the allowed SSC mode of the first PDU session. That is, the terminal device may attempt again to establish the first PDU session based on the allowed SSC mode of the first PDU session. This manner can effectively prevent the terminal device from attempting to establish the first PDU session based on another SSC mode that is not allowed, thereby effectively improving processing efficiency.

It may be learned from the foregoing content that, in Embodiment 2, in a registration phase, the PCF network element generates the first SSC mode limitation information based on the capability information of the terminal device, the subscription information of the terminal device, the network capability information, and the AF policy. Because the PCF network element generates the first SSC mode limitation information with reference to a plurality of dimensions of information, the SSC mode limitation information is more proper and effective, such that the terminal device selects an available SSC mode based on the first SSC mode limitation information. In a phase of determining an SSC mode, the SMF network element determines, based on one or more of the capability information of the terminal device, the subscription information of the terminal device, the network capability information, or the DN authentication information, whether the requested SSC mode is supported, and provides the specific cause code when the requested SSC mode is not supported, such that the terminal device performs a corresponding operation based on the cause code.

Embodiment 3

Figure 5A:
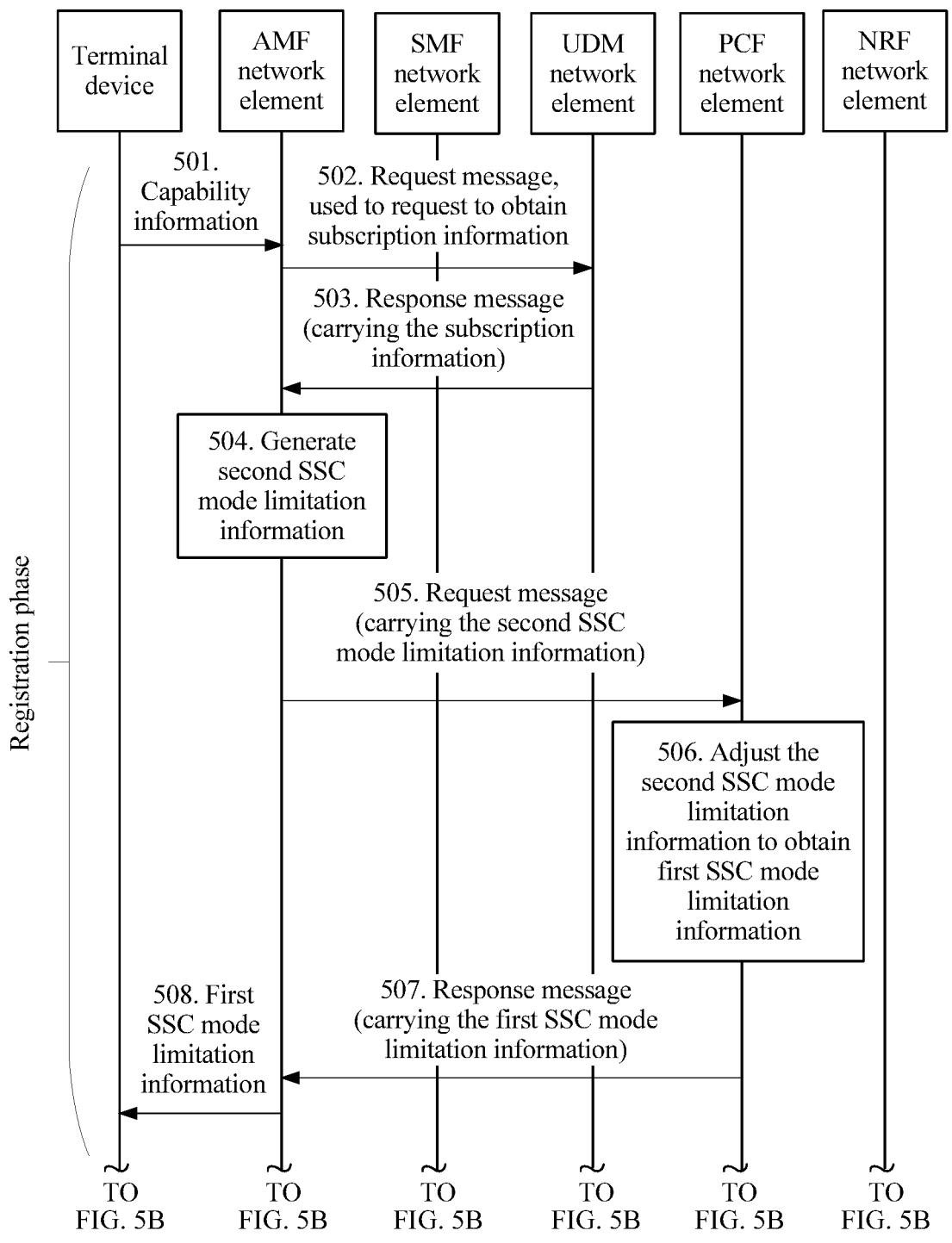
FIG. 5A and FIG. 5B are schematic flowcharts corresponding to a method for determining an SSC mode according to Embodiment 3 of this application.
Figure 5B:
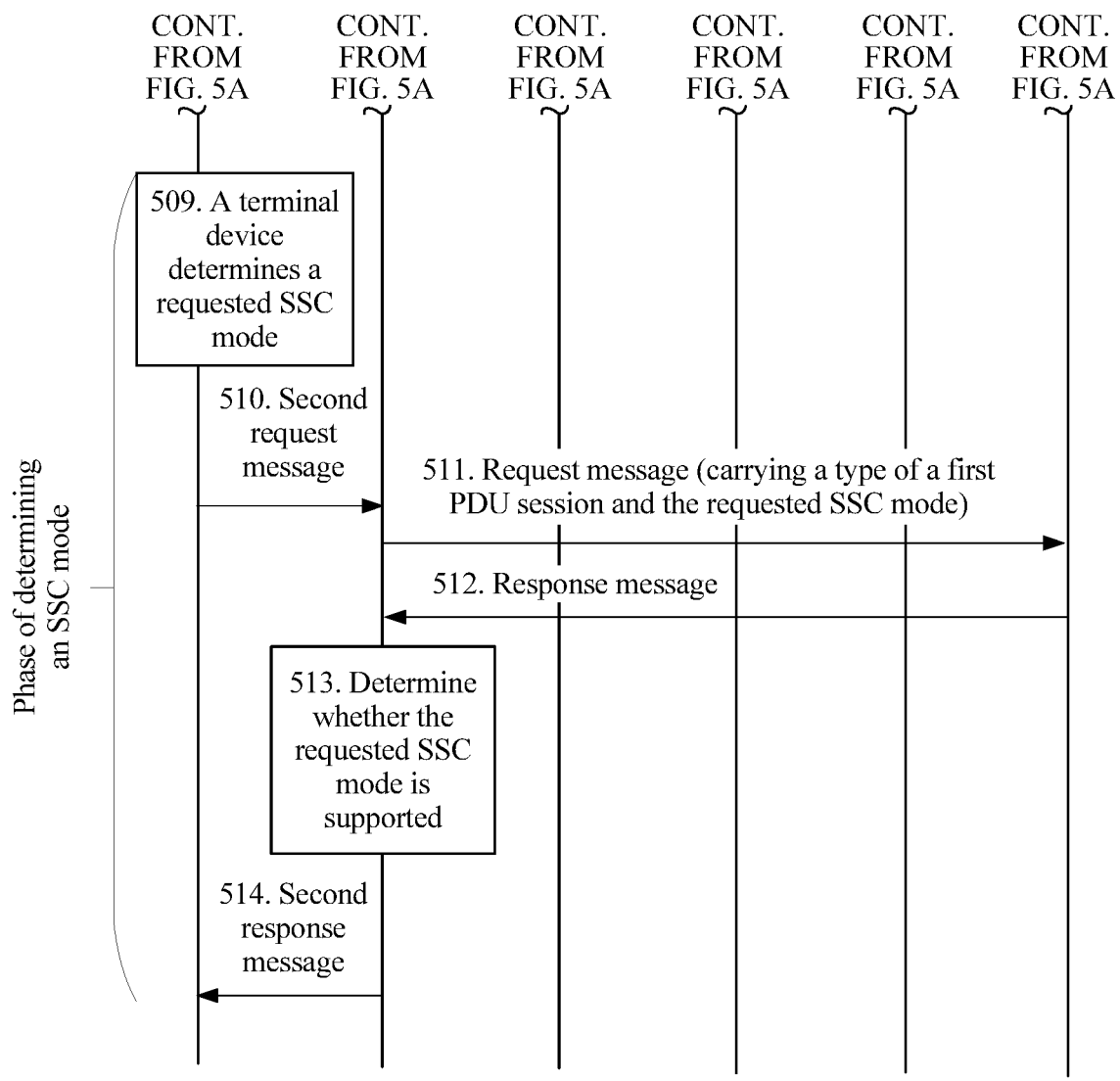

FIG. 5A and FIG. 5B are a schematic flowchart corresponding to a method for determining an SSC mode according to Embodiment 3 of this application. As shown in FIG. 5A and FIG. 5B, the method includes the following steps.

Step 501: A terminal device sends capability information of the terminal device to an AMF network element.

Herein, the capability information of the terminal device is used to indicate whether the terminal device supports an SSC mode 3 of a Non-IP session.

Step 502: After receiving the capability information of the terminal device, the AMF network element sends a request message to a UDM network element, to request to obtain subscription information of the terminal device.

Step 503: The UDM network element sends a response message to the AMF network element.

Herein, the response message may include the subscription information of the terminal device, and the subscription information is used to indicate a session type and an associated SSC mode that are allowed for a PDU session of the terminal device.

The response message may further include LBO indication information, used to indicate whether the terminal device is allowed to use an LBO session in an accessed PLMN network.

Step 504: The AMF network element selects a home network or a visited network based on LBO indication information, and generates second SSC mode limitation information based on network capability information of the selected network, the subscription information of the terminal device, and the capability information of the terminal device.

Step 505: The AMF network element sends a request message (Npcf_AMPolicyControl_Get) to a PCF network element, where the request message includes the second SSC mode limitation information.

Step 506: The PCF network element adjusts the second SSC mode limitation information.

In a case, the PCF network element is a V-PCF network element. If the LBO indication information indicates that LBO is allowed to be used, the V-PCF network element adjusts the second SSC mode limitation information to obtain first SSC mode limitation information. Alternatively, if the LBO indication information indicates that LBO is not allowed to be used, the V-PCF network element sends information to an H-PCF network element, and the H-PCF network element adjusts the second SSC mode limitation information to obtain first SSC mode limitation information.

In some cases, the PCF network element may adjust the second SSC mode limitation information based on an AF policy or a local policy. For example, the second SSC mode limitation information includes an Ethernet session and an associated SSC mode (including an SSC mode 2 and the SSC mode 3), and the AF policy or the local policy indicates that the terminal device is not allowed to use the SSC mode 3 of the Ethernet session. Therefore, the PCF network element may adjust the SSC mode associated with the Ethernet session from the SSC mode 2 and the SSC mode 3 to the SSC mode 2, in other words, delete the SSC mode 3.

Step 507: The AMF network element receives a response message (Npcf_AMPolicyControl_Get Response/Npcf_AMPolicyControl_UpdateNotify) sent by the PCF network element, where the response message includes first SSC mode limitation information.

Herein, the first SSC mode limitation information may include a session type and an associated SSC mode that are available for a PDU session of the terminal device. Table 2 shows an example of the first SSC mode limitation information.

TABLE 2

Example of the first SSC mode limitation information

| Session type of a PDU session | Associated SSC mode |
|---|---|
| Ethernet session | SSC mode 3 |
| Unstructured session | SSC mode 2 and SSC mode 3 |

In Table 2, the available session type of the PDU session of the terminal device includes the Ethernet session and the unstructured session, an SSC mode associated with the Ethernet session includes the SSC mode 3, and an SSC mode associated with the unstructured session includes the SSC mode 2 and the SSC mode 3.

In another possible embodiment, the first SSC mode limitation information may alternatively include a session type of a PDU session and an unassociated SSC mode. For example, in the first SSC mode limitation information, if SSC modes that are not associated with an Ethernet session are an SSC mode 1 and an SSC mode 2, it may be learned that an SSC mode that is associated with the Ethernet session is an SSC mode 3.

Step 508: The AMF network element sends the first SSC mode limitation information to the terminal device.

For example, the AMF network element may send a registration accept message to the terminal device, where the registration accept message includes the first SSC mode limitation information.

Step 509: The terminal device determines a requested SSC mode (namely, an available SSC mode of a first PDU session).

In some cases, the terminal device may determine the requested SSC mode based on the first SSC mode limitation information. In an example, referring to the foregoing Table 2, the terminal device establishes the first PDU session, where a session type of the first PDU session is the unstructured session. Therefore, the terminal device may determine that the requested SSC mode is the SSC mode 3.

Step 510: The terminal device sends a second request message to the AMF network element, where the second request message includes a session type of the first PDU session and the requested SSC mode.

Step 511: The AMF network element sends a request message (Nnrf_NFDiscovery) to a network function (NF) repository function (NRF) network element, where the request message includes the LBO indication information, the requested SSC mode, and the session type of the first PDU session.

Step 512: The NRF network element selects an available SMF network element based on registration information of SMF network elements and the request message sent by the AMF network element, and sends a response message (Nnrf_NFDiscovery Response) to the AMF network element.

Herein, the NRF network element may obtain the registration information of the SMF network elements in a network in advance, and the registration information of the SMF network elements is used to indicate session types of PDU sessions supported by the SMF network elements and associated SSC modes. Then, the NRF network element may select, based on the registration information of the SMF network elements, an SMF network element that can support the session type of the first PDU session and the requested SSC mode.

Step 513: The AMF network element determines, based on the first SSC mode limitation information and the response message of the NRF network element, whether the SSC mode requested by the terminal device is supported.

Herein, if the AMF network element determines that the response message returned by the NRF is null, that is, there is no available SMF network element, or determines that the response message indicates that the SMF selection fails, the AMF network element may directly determine that establishment of the first PDU session is rejected.

Step 514: The AMF network element returns a second response message to the terminal device, where the response message is used to indicate that establishment of the first PDU session is supported or rejected.

Herein, if the second response message is used to indicate that establishment of the first PDU session is rejected, the terminal device may attempt to use another type of PDU session or another SSC mode. Alternatively, if the second response message is used to indicate that establishment of the first PDU session is supported, the terminal device may perform a subsequent procedure of establishing the first PDU session.

It should be noted that: (1) Step 511 and Step 512 are optional steps. In this embodiment of this application, the AMF network element may alternatively directly determine, based on the first SSC mode limitation information, whether the SSC mode requested by the terminal device is supported. (2) Because the AMF network element determines, based on the first SSC mode limitation information, whether the SSC mode requested by the terminal device is supported, when determining that the SSC mode requested by the terminal device is not supported, the AMF network element directly indicates that the first PDU session is rejected, without adding cause code about the rejection of the first PDU session.

It may be learned from the foregoing content that, in Embodiment 3, in a registration phase, the AMF network element generates the first SSC mode limitation information based on the capability information of the terminal device, the subscription information of the terminal device, and the network capability information. Because the AMF network element generates the first SSC mode limitation information with reference to a plurality of dimensions of information, the SSC mode limitation information is more proper and effective, such that the terminal device selects an available SSC mode based on the first SSC mode limitation information. In addition, because the AMF network element does not need to send the subscription information of the terminal device and the capability information of the terminal device to the PCF network element, some signaling overheads can be saved. In a phase of determining an SSC mode, the AMF network element determines, based on the first SSC mode limitation information, whether the requested SSC mode is supported, without forwarding the request message of the terminal device to the SMF network element, such that processing efficiency can be effectively improved.

Embodiment 4

Figure 6A:
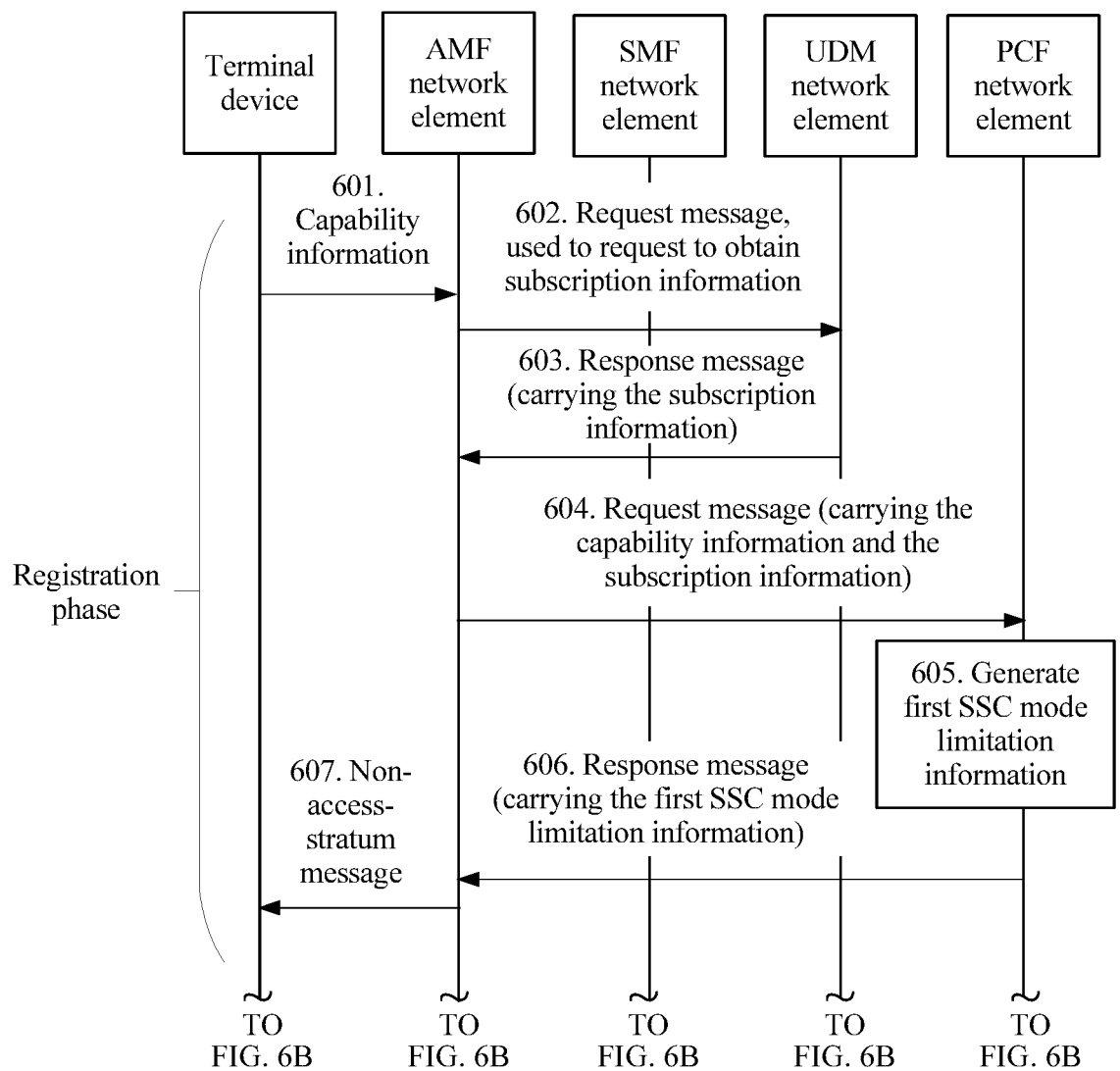
FIG. 6A and FIG. 6B are schematic flowcharts corresponding to a method for determining an SSC mode according to Embodiment 4 of this application.
Figure 6B:
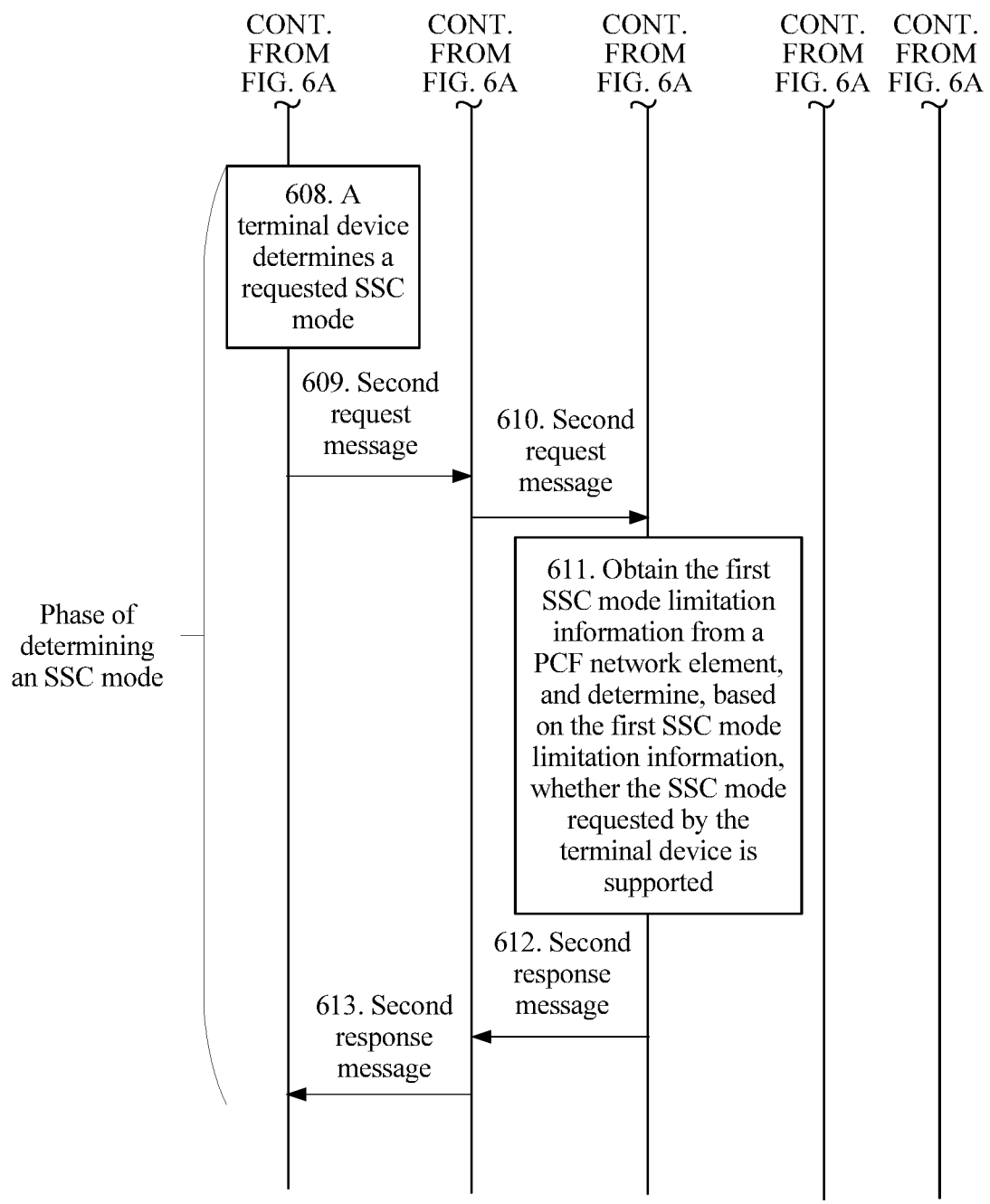

FIG. 6A and FIG. 6B are schematic flowcharts corresponding to a method for determining an SSC mode according to Embodiment 4 of this application. As shown in FIG. 6A and FIG. 6B, the method includes the following steps.

Step 601: A terminal device sends capability information of the terminal device to an AMF network element.

Step 602: After receiving the capability information of the terminal device, the AMF network element sends a request message to a UDM network element, to request to obtain subscription information of the terminal device.

Step 603: The UDM network element sends a response message to the AMF network element. Herein, the response message may include the subscription information of the terminal device.

Step 604: After receiving the response message returned by the UDM network element, the AMF network element may send a request message to a PCF network element.

Herein, the request message may include the capability information of the terminal device and the subscription information of the terminal device.

Step 605: After receiving the request message sent by the AMF network element, the PCF network element may generate first SSC mode limitation information based on the capability information of the terminal device, the subscription information of the terminal device, network capability information, and an AF policy.

Step 606: The PCF network element returns a response message to the AMF network element, where the response message includes the first SSC mode limitation information.

Step 607: After receiving the first SSC mode limitation information sent by the PCF network element, the AMF network element sends the first SSC mode limitation information to the terminal device.

Step 608: The terminal device determines a requested SSC mode.

For the foregoing steps, refer to the descriptions of step 401 to step 408 in Embodiment 2.

Step 609: The terminal device sends a second request message to the AMF network element, where the second request message includes a session type of a first PDU session and the requested SSC mode. Optionally, the second request message may further include first indication information.

Step 610: The AMF network element forwards the second request message to an SMF network element.

Step 611: The SMF network element obtains the first SSC mode limitation information from the PCF network element, and determines, based on the first SSC mode limitation information, whether the SSC mode requested by the terminal device is supported.

Step 612: The SMF network element returns a second response message to the AMF network element, where the second response message is used to indicate that the SSC mode requested by the terminal device is supported or rejected.

Step 613: The AMF network element returns the second response message to the terminal device.

Herein, if the second response message is used to indicate that establishment of the first PDU session is rejected, the terminal device may attempt to use another type of PDU session or another SSC mode. Alternatively, if the second response message is used to indicate that establishment of the first PDU session is supported, the terminal device may perform a subsequent procedure of establishing the first PDU session.

It should be noted that: (1) In this embodiment of this application, a manner in which the SMF network element obtains the first SSC mode limitation information from the PCF network element is not specifically limited. For example, the first SSC mode limitation information may be returned by the PCF network element to the SMF network element after the SMF network element sends a request message to the PCF network element. Alternatively, the first SSC mode limitation information may be actively sent by the PCF network element to the SMF network element. (2)

Because the SMF network element determines, based on the first SSC mode limitation information, whether the SSC mode requested by the terminal device is supported, when determining that the SSC mode requested by the terminal device is not supported, the SMF network element directly indicates that the first PDU session is rejected, without adding cause code about the rejection of the first PDU session.

It may be learned from the foregoing content that, in Embodiment 4, in a registration phase, the PCF network element generates the first SSC mode limitation information based on the capability information of the terminal device, the subscription information of the terminal device, the network capability information, and the AF policy. This is the same as the manner in Embodiment 2. In a phase of determining an SSC mode, the SMF network element obtains the first SSC mode limitation information from the PCF network element, and determines, based on the first SSC mode limitation information, whether the requested SSC mode is supported. Therefore, processing efficiency can be effectively improved. Based on this manner of determining the SSC mode, in another possible embodiment, in a registration phase, if the AMF network element generates the first SSC mode limitation information based on the capability information of the terminal device, the subscription information of the terminal device, and the network capability information, the SMF network element may alternatively obtain the first SSC mode limitation information from the AMF network element, and determine, based on the first SSC mode limitation information, whether the requested SSC mode is supported. This is not specifically limited.

Embodiment 5

Figure 7A:
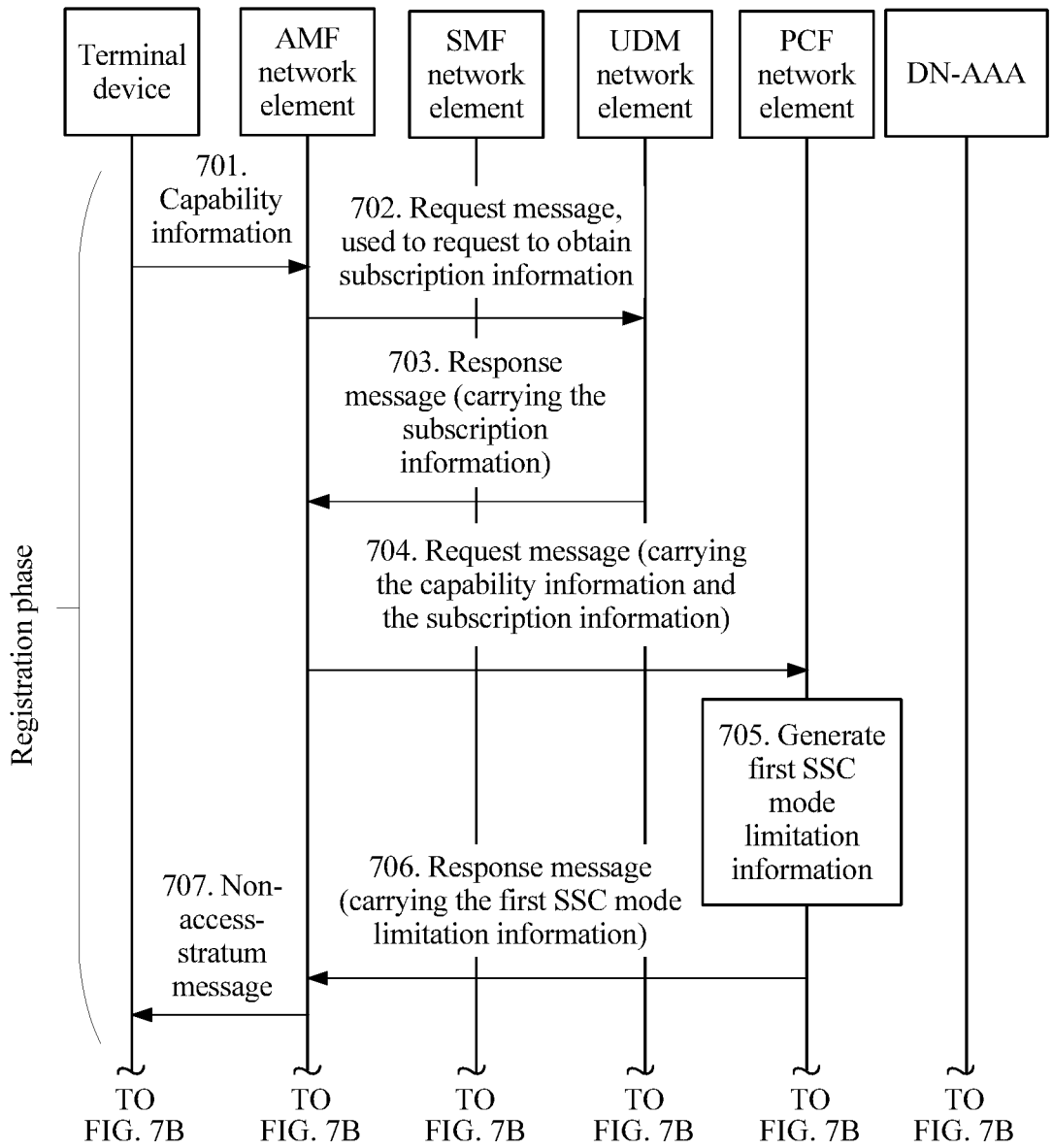
FIG. 7A and FIG. 7B are schematic flowcharts corresponding to a method for determining an SSC mode according to Embodiment 5 of this application.
Figure 7B:
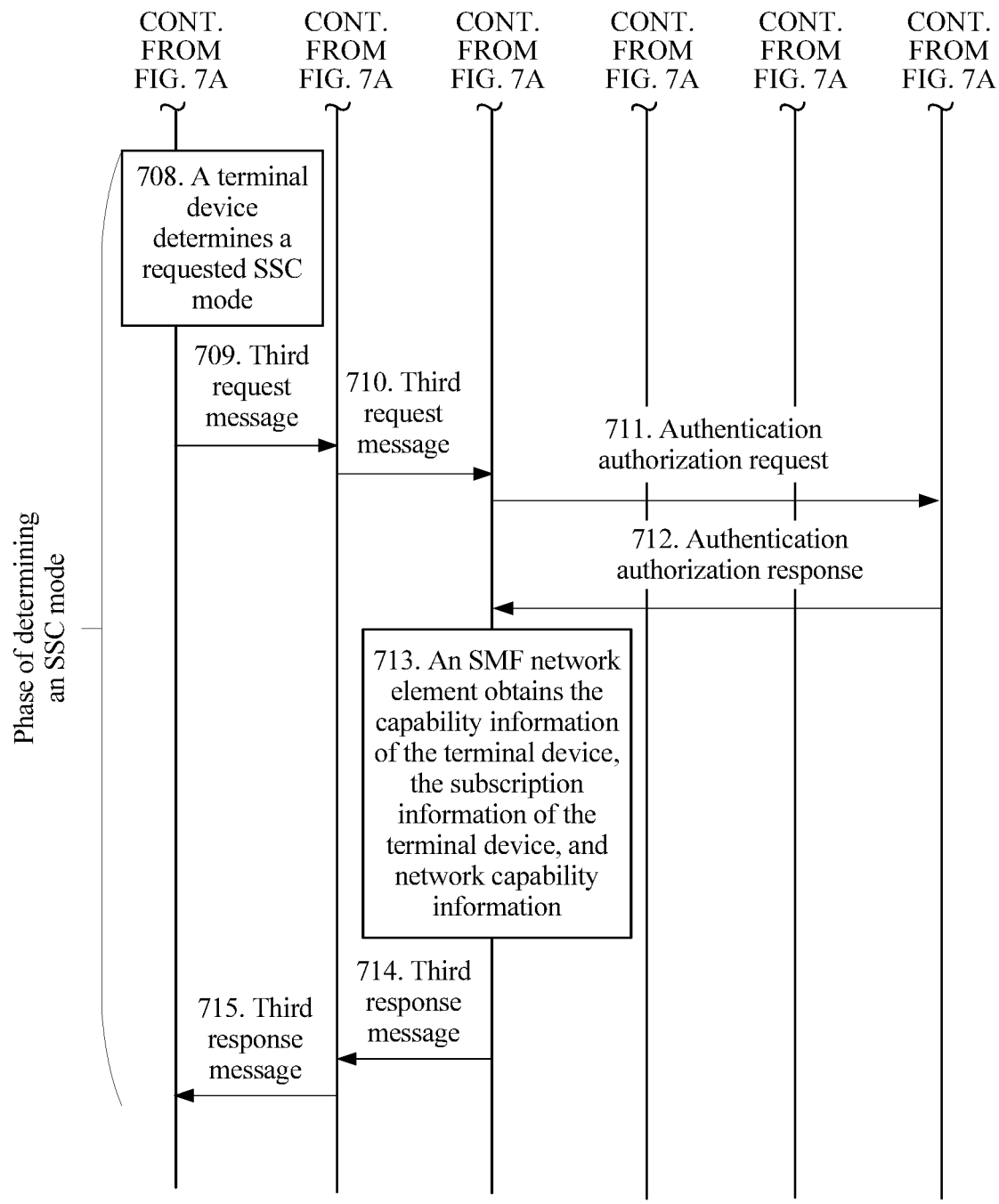

FIG. 7A and FIG. 7B are schematic flowcharts corresponding to a method for determining an SSC mode according to Embodiment 5 of this application. As shown in FIG. 7A and FIG. 7B, the method includes the following steps.

Step 701: A terminal device sends capability information of the terminal device to an AMF network element.

Step 702: After receiving the capability information of the terminal device, the AMF network element sends a request message to a UDM network element, to request to obtain subscription information of the terminal device.

Step 703: The UDM network element sends a response message to the AMF network element. Herein, the response message may include the subscription information of the terminal device.

Step 704: After receiving the response message returned by the UDM network element, the AMF network element may send a request message to a PCF network element.

Herein, the request message may include the capability information of the terminal device and the subscription information of the terminal device.

Step 705: After receiving the request message sent by the AMF network element, the PCF network element may generate first SSC mode limitation information based on the capability information of the terminal device, the subscription information of the terminal device, network capability information, and an AF policy.

Step 706: The PCF network element returns a response message to the AMF network element, where the response message includes the first SSC mode limitation information.

Step 707: After receiving the first SSC mode limitation information sent by the PCF network element, the AMF network element sends the first SSC mode limitation information to the terminal device.

Step 708: The terminal device determines a requested SSC mode.

For the foregoing steps, refer to the descriptions of step 401 to step 408 in Embodiment 2.

Step 709: The terminal device sends a third request message to the AMF network element, where the third request message includes a session type of a first PDU session and the requested SSC mode.

Step 710: The AMF network element forwards the third request message to an SMF network element.

Step 711: After receiving the third request message, the SMF network element sends an authentication authorization request to a DN-AAA, where the authentication authorization request may include DN authentication authorization information (that is, the session type of the first PDU session and the requested SSC mode), and may further include a PLMN (that is, a PLMN in which the SMF network element is located).

Step 712: The SMF network element receives an authentication authorization response message from the DN-AAA, where the authentication authorization response message includes DN authentication authorization information.

Step 713: The SMF network element obtains the capability information of the terminal device, the subscription information of the terminal device, and the network capability information.

Step 714: The SMF network element returns a third response message to the AMF network element.

Herein, the SMF network element may determine, based on determining information, whether the requested SSC mode is supported. If the SMF network element determines that the requested SSC mode is not supported, the SMF network element may modify the requested SSC mode, and return the third response message to the AMF network element. The third response message is used to indicate that the SSC mode requested by the terminal device is modified to a new SSC mode and that the new SSC mode is a unique allowed SSC mode.

For example, the third response message may include the new SSC mode and second indication information, and the second indication information is used to indicate that the new SSC mode is the unique allowed SSC mode.

Step 715: The AMF network element sends the third response message to the terminal device.

In this way, after receiving the third response message, the terminal device may no longer attempt to use another SSC mode, to avoid a problem that a processing procedure is relatively complex because the terminal device attempts to use an SSC mode that is not allowed or attempts to use another SSC mode for a plurality of times.

It may be learned in combination of the foregoing Embodiment 2, Embodiment 3, Embodiment 4, and Embodiment 5 that, in the registration phase, there may be two manners of generating the first SSC mode limitation information: Manner 1a: The PCF network element generates the first SSC mode limitation information based on the capability information of the terminal device, the subscription information of the terminal device, the network capability information, and the AF policy (Embodiment 2, Embodiment 4, and Embodiment 5). Manner 2a: The AMF network element generates the first SSC mode limitation information based on the capability information of the terminal device, the subscription information of the terminal device, and the network capability information (Embodiment 3). In the phase of determining the SSC mode, there are three manners of determining whether the requested SSC mode is supported: Manner 1b: The SMF network element determines, based on the determining information, whether the requested SSC mode is supported (Embodiment 2 and Embodiment 5). Manner 2b: The AMF network element determines, based on the first SSC mode limitation information, whether the requested SSC mode is supported (Embodiment 3). Manner 3b: The SMF network element determines, based on the first SSC mode limitation information, whether the requested SSC mode is supported (Embodiment 4).

In another possible embodiment, Manner 2a may be used in a registration phase and Manner 1b may be used in a phase of determining an SSC mode. Alternatively, Manner 2a may be used in a registration phase and Manner 3b may be used in a phase of determining an SSC mode, or another possible combination manner may be used. This is not specifically limited in the embodiments of this application.

In the embodiments of this application, in Manner 1b, if the SMF network element receives the first request message (carrying the first indication information), after determining that the requested SSC mode is not supported, the SMF network element may return the first response message, used to indicate that establishment of the first PDU session is rejected. If the SMF network element receives the third request message (carrying no first indication information), after determining that the requested SSC mode is not supported, the SMF network element may modify the requested SSC mode to the new SSC mode, and return the third response message, used to indicate that the SSC mode requested by the terminal device is modified to the new SSC mode and that the new SSC mode is the unique allowed SSC mode. In Manner 2b and Manner 3b, after receiving the second request message (which may carry the first indication information or may not carry the first indication information) and determining, based on the first SSC mode limitation information, that the requested SSC mode is not supported, the SMF network element or the AMF network element cannot directly learn of a reason why the requested SSC mode is not supported, and therefore cannot accurately modify the requested SSC mode. Therefore, regardless of whether the second request message carries the first indication information, without modifying the requested SSC mode, the SMF network element or the AMF network element can directly return the second response message, used to indicate that establishment of the first PDU session is rejected.

For the foregoing method procedures, the embodiments of this application further provide a terminal device and a core network element. For implementations of the terminal device and the core network element, refer to the foregoing method procedures.

Figure 8:
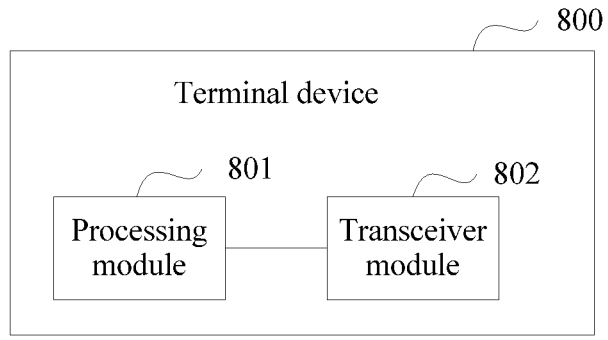
FIG. 8 is a schematic structural diagram of a terminal device according to an embodiment of this application.

FIG. 8 is a schematic structural diagram of a terminal device according to an embodiment of this application. The terminal device may be configured to implement the foregoing corresponding procedures performed by the terminal device in FIG. 3 to FIG. 7A and FIG. 7B. The terminal device 800 includes a processing module 801 and a transceiver module 802.

The processing module 801 is configured to determine a requested SSC mode. The transceiver module 802 is configured to send a first request message to a first core network element, where the first request message is used to request to establish a first PDU session, and the first request message includes a session type of the first PDU session and the requested SSC mode.

In a possible design, the first request message may further include first indication information, and the first indication information is used to indicate that the requested SSC mode is not allowed to be modified.

In a possible design, before the processing module 801 determines the requested SSC mode, the transceiver module 802 is further configured to: send capability information of the terminal device to a second core network element, where the capability information of the terminal device is used to indicate whether the terminal device supports an SSC mode 3 of a Non-IP session; and receive first SSC mode limitation information from the second core network element, where the first SSC mode limitation information is determined based on the capability information of the terminal device, subscription information of the terminal device, and network capability information. The subscription information is used to indicate a session type and an associated SSC mode that are allowed for a PDU session of the terminal device, and the network capability information is used to indicate whether a network supports the SSC mode 3 of the Non-IP session. The processing module 801 is configured to determine the requested SSC mode based on the session type of the first PDU session and the first SSC mode limitation information.

In a possible design, the transceiver module 802 is further configured to receive first SSC mode limitation information from a third core network element, where the first SSC mode limitation information is determined based on capability information of the terminal device, subscription information of the terminal device, network capability information, and an AF policy. The capability information of the terminal device is used to indicate whether the terminal device supports an SSC mode 3 of a Non-IP session, the subscription information is used to indicate a session type and an associated SSC mode that are allowed for a PDU session of the terminal device, the network capability information is used to indicate whether a network supports the SSC mode 3 of the Non-IP session, and the AF policy includes at least one application identity and an associated SSC mode. The processing module 801 is configured to determine the requested SSC mode based on the application identity, the session type of the first PDU session, and the first SSC mode limitation information.

In a possible design, the requested SSC mode is a unique SSC mode that meets the first SSC mode limitation information.

In a possible design, the processing module 801 is configured to: use, as the requested SSC mode, an SSC mode provided by an application program; or obtain the requested SSC mode according to a default SSC mode selection policy rule.

In a possible design, after sending the first request message to the first core network element, the transceiver module 802 is further configured to receive a first response message from the first core network element, where the first response message is used to indicate that establishment of the first PDU session is rejected.

In a possible design, the first response message includes a cause code about the rejection to establish the first PDU session. The cause code is used to indicate at least one of the following: the terminal device does not support the requested SSC mode; the network does not support the requested SSC mode; a data network DN does not support the requested SSC mode; or a subscription does not support the requested SSC mode.

In a possible design, the processing module 801 is further configured to: if the cause code is used to indicate that the terminal device does not support the requested SSC mode and/or that the subscription does not support the requested SSC mode, determine the requested SSC mode as an SSC mode that is not associated with the session type of the first PDU session; or if the cause code is used to indicate that the network does not support the requested SSC mode, determine, when an accessed PLMN does not change, the requested SSC mode as an SSC mode that is not associated with the session type of the first PDU session; or if the cause code is used to indicate that the DN does not support the requested SSC mode, determine, when a DNN does not change, the requested SSC mode as an SSC mode that is not associated with the session type of the first PDU session.

In a possible design, the first response message further includes an allowed SSC mode of the first PDU session.

In a possible design, after the receiving, by the terminal device, a first response message from the first core network element, the method further includes sending, by the terminal device, a fourth request message to the first core network element based on the first response message, where the fourth request message is used to request to establish the first PDU session, and the fourth request message includes the allowed SSC mode of the first PDU session.

Figure 9:
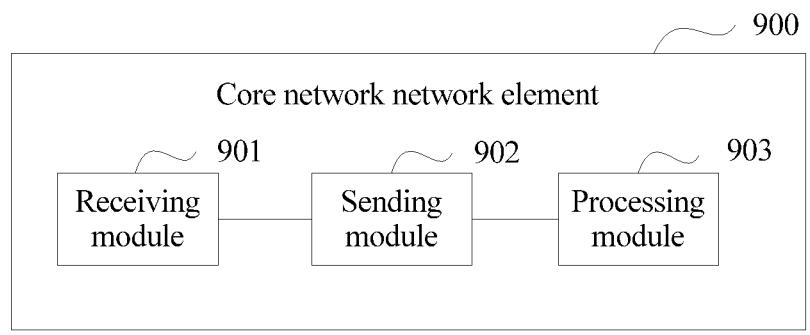
FIG. 9 is a schematic structural diagram of a core network element according to an embodiment of this application.

FIG. 9 is a schematic structural diagram of a core network element according to an embodiment of this application. The core network element may be configured to implement the foregoing corresponding procedures performed by the core network element in FIG. 3 to FIG. 6A and FIG. 6B. The core network element 900 includes a receiving module 901, a sending module 902, and a processing module 903.

The receiving module 901 is configured to receive a first request message from a terminal device, where the first request message includes a session type of a first PDU session and a requested SSC mode. The sending module 902 is configured to return a first response message to the terminal device.

In a possible design, the first request message further includes first indication information, and the first indication information is used to indicate that the requested SSC mode is not allowed to be modified.

In a possible design, the first response message is used to indicate that the requested SSC mode is rejected.

In a possible design, the processing module 903 is configured to: obtain determining information, where the determining information includes one or more of subscription information of the terminal device, network capability information, DN authentication information, or capability information of the terminal device, the subscription information is used to indicate a session type and an associated SSC mode that are allowed for a PDU session of the terminal device, the network capability information is used to indicate whether a network supports an SSC mode 3 of a Non-IP session, the capability information of the terminal device is used to indicate whether the terminal device supports the SSC mode 3 of the Non-IP session, and the DN authentication information is used to indicate a session type of a PDU session supported by a DN and an associated SSC mode; and determine, based on the determining information, that the requested SSC mode is not supported.

In a possible design, the first response message includes a cause code about a rejection to establish the first PDU session.

In a possible design: if the processing module 903 determines, based on the subscription information of the terminal device, that the requested SSC mode is not supported, the cause code indicates that a subscription does not support the requested SSC mode; or if the processing module 903 determines, based on the network capability information, that the requested SSC mode is not supported, the cause code indicates that the network does not support the requested SSC mode; or if the processing module 903 determines, based on the DN authentication information, that the requested SSC mode is not supported, the cause code indicates that the DN does not support the requested SSC mode; or if the processing module 903 determines, based on the capability information of the terminal device, that the requested SSC mode is not supported, the cause code indicates that the terminal device does not support the requested SSC mode.

In a possible design, the first response message further includes an allowed SSC mode of the first PDU session.

In a possible design, the first core network element is an AMF network element or an SMF network element. Additionally, the processing module 903 is further configured to: obtain first SSC mode limitation information, where the first SSC mode limitation information is determined based on subscription information of the terminal device, network capability information, and capability information of the terminal device; and determine, based on the first SSC mode limitation information, that the requested SSC mode is not supported.

Figure 10:
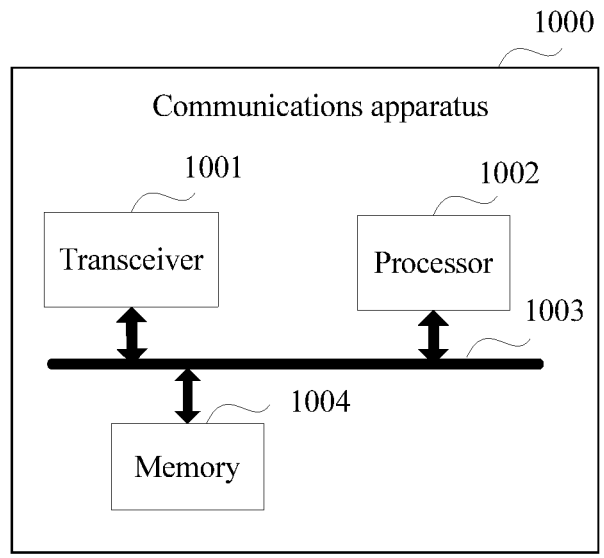
FIG. 10 is a schematic structural diagram of a communications apparatus according to an embodiment of this application.

FIG. 10 is a schematic structural diagram of a communications apparatus according to an embodiment of this application. The communications apparatus may be a terminal device or a core network element. As shown in FIG. 10, the communications apparatus 1000 includes a transceiver 1001 and a processor 1002.

The transceiver 1001 is configured to communicate and interact with another device.

The transceiver 1001 may be a radio frequency (RF) circuit, a Wi-Fi module, a communications interface, a Bluetooth module, or the like.

The processor 1002 is configured to implement the step procedures in the foregoing method embodiments.

Optionally, the communications apparatus 1000 may further include a memory 1004, configured to store a program and the like. For example, the program may include program code, and the program code includes an instruction. The memory 1004 may include a random access memory (RAM), or may further include a nonvolatile memory, for example, at least one magnetic disk memory. The processor 1002 executes an application program stored in the memory 1004, to implement the foregoing functions.

In a possible manner, the transceiver 1001, the processor 1002, and the memory 1004 are communicatively connected. For example, the transceiver 1001, the processor 1002, and the memory 1004 may be connected to each other using a bus 1003. The bus 1003 may be a Peripheral Component Interconnect (PCI) bus, an Extended Industry Standard Architecture (EISA) bus, or the like. The bus may be classified as an address bus, a data bus, a control bus, or the like. For ease of representation, only one thick line is used to represent the bus in FIG. 10, but this does not mean that there is only one bus or only one type of bus.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of the present disclosure are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid state disk (SSD)), or the like.

A person skilled in the art should understand that the embodiments of the present disclosure may be provided as a method, a system, or a computer program product. Therefore, the embodiments of the present disclosure may use a form of hardware only embodiments, software only embodiments, or embodiments with a combination of software and hardware. In addition, the embodiments of the present disclosure may use a form of a computer program product that is implemented on one or more computer-usable storage media (including but not limited to a magnetic disk memory, a compact disc read-only memory (CD-ROM), an optical memory, and the like) that include computer-usable program code.

The embodiments of the present disclosure are described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, such that the instructions executed by a computer or a processor of another programmable data processing device generate an apparatus for implementing a specified function in one or more processes in the flowcharts and/or in one or more blocks in the block diagrams.

These computer program instructions may be alternatively stored in a computer-readable memory that can instruct a computer or another programmable data processing device to work in a specific manner, such that the instructions stored in the computer-readable memory generate an artifact that includes an instruction apparatus. The instruction apparatus implements a specified function in one or more processes in the flowcharts and/or in one or more blocks in the block diagrams.

These computer program instructions may be alternatively loaded onto a computer or another programmable data processing device, such that a series of operations and steps are performed on the computer or the other programmable device, thereby generating computer-implemented processing. Therefore, the instructions executed on the computer or the other programmable device provide steps for implementing a specified function in one or more processes in the flowcharts and/or in one or more blocks in the block diagrams.

A person skilled in the art can make various modifications and variations to the embodiments of the present disclosure without departing from the spirit and scope of this application. In this way, this application is intended to cover these modifications and variations provided that they fall within the scope of the claims of this application and equivalent technologies thereof

What is claimed is:

1. A method, comprising:
   determining a requested service and session continuity (SSC) mode;
   sending a first request message to a first core network element, wherein the first request message is a request for establishing a first protocol data unit (PDU) session with a first session type by using the requested SSC mode, and wherein the first session type is any one of an Internet Protocol (IP) session type, an Ethernet session type, or an unstructured session type;
   receiving, in response to sending the first request message, a first response message from the first core network element, wherein the first response message indicates that the request for establishing the first PDU session is rejected, wherein the first response message comprises a cause code and an allowed SSC mode that is allowed for the first session type, wherein the allowed SSC mode is different than the requested SSC mode, and wherein the cause code indicates that the requested SSC mode is not supported; and
   reattempting, in response to the cause code, to establish the first PDU session with the first session type by using the allowed SSC mode that is allowed for the first session type.

2. The method of claim 1, wherein the first request message further comprises first indication information, and wherein the first indication information indicates that the requested SSC mode is not allowed to be modified.

3. The method of claim 1, further comprising receiving first SSC mode limitation information, wherein the first SSC mode limitation information comprises at least one available session type and at least one associated available SSC mode, and wherein determining the requested SSC mode comprises determining, based on the first SSC mode limitation information, the requested SSC mode.

4. The method of claim 3, wherein the first SSC mode limitation information is associated with subscription information, and wherein the subscription information indicates at least one allowed session type and at least one associated allowed SSC mode.

5. The method of claim 3, wherein the requested SSC mode is a unique SSC mode that meets the first SSC mode limitation information.

6. The method of claim 1, wherein determining the requested SSC mode comprises obtaining the requested SSC mode according to a default SSC mode selection policy rule.

7. An apparatus, comprising:
   a memory configured to store instructions; and
   one or more processors coupled to the memory and configured to execute the instructions to cause the apparatus to:
      determine a requested service and session continuity (SSC) mode;
      send a first request message to a first core network element, wherein the first request message is a request for establishing a first protocol data unit (PDU) session with a first session type by using the requested SSC mode, and wherein the first session type is any one of an Internet Protocol (IP) session type, an Ethernet session type, or an unstructured session type;
      receive, in response to sending the first request message, a first response message from the first core network element, wherein the first response message indicates that the request for establishing the first PDU session is rejected, wherein the first response message comprises a cause code and an allowed SSC mode that is allowed for the first session type, wherein the allowed SSC mode is different than the requested SSC mode, and wherein the cause code indicates that the requested SSC mode is not supported; and
      reattempt, in response to the cause code, to establish the first PDU session with the first session type by using the allowed SSC mode that is allowed for the first session type.

8. The apparatus of claim 7, wherein the one or more processors are further configured to execute the instructions to cause the apparatus to:
   receive first SSC mode limitation information, wherein the first SSC mode limitation information comprises at least one available session type and at least one associated available SSC mode for the apparatus; and
   determine the requested SSC mode based on the first SSC mode limitation information.

9. The apparatus of claim 8, wherein the first SSC mode limitation information is associated with subscription information of the apparatus, and wherein the subscription information indicates at least one allowed session type and at least one associated allowed SSC mode for the apparatus.

10. The apparatus of claim 7, wherein the one or more processors are further configured to execute the instructions to cause the apparatus to obtain the requested SSC mode according to a default SSC mode selection policy rule.

11. The apparatus of claim 7, wherein the apparatus comprises a terminal device or a chip in the terminal device.

12. A computer program product comprising instructions stored on a non-transitory computer-readable medium that, when executed by one or more processors of an apparatus, cause the apparatus to:
   determine a requested service and session continuity (SSC) mode;
   send a first request message to a first core network element, wherein the first request message is a request for establishing a first protocol data unit (PDU) session with a first session type by using the requested SSC mode, and wherein the first session type is any one of an Internet Protocol (IP) session type, an Ethernet session type, or an unstructured session type;
   receive, in response to sending the first request message, a first response message from the first core network element, wherein the first response message indicates that the request for establishing the first PDU session is rejected, wherein the first response message comprises a cause code and an allowed SSC mode that is allowed for the first session type, wherein the allowed SSC mode is different than the requested SSC mode, and wherein the cause code indicates that the requested SSC mode is not supported; and
   reattempt, in response to the cause code, to establish the first PDU session with the first session type by using the allowed SSC mode that is allowed for the first session type.

13. The computer program product of claim 12, wherein the first request message further comprises first indication information, and wherein the first indication information indicates that the requested SSC mode is not allowed to be modified.

14. The computer program product of claim 12, wherein the one or more processors are further configured to execute the instructions to cause the apparatus to:
receive first SSC mode limitation information, wherein the first SSC mode limitation information comprises at least one available session type and at least one associated available SSC mode for the apparatus; and
determine the requested SSC mode based on the first SSC mode limitation information.

15. The computer program product of claim 14, wherein the first SSC mode limitation information is associated with subscription information of the apparatus, and wherein the subscription information indicates at least one allowed session type and at least one associated allowed SSC mode for the apparatus.

16. The computer program product of claim 12, wherein the one or more processors are further configured to execute the instructions to cause the apparatus to obtain the requested SSC mode according to a default SSC mode selection policy rule.

17. The method of claim 1, wherein the first session type is the unstructured session type or the Ethernet session type, and wherein the requested SSC mode is SSC mode 3.

18. The apparatus of claim 7, wherein the first session type is the unstructured session type or the Ethernet session type, and wherein the requested SSC mode is SSC mode 3.

19. The computer program product of claim 12, wherein the first session type is the unstructured session type or the Ethernet session type, and wherein the requested SSC mode is SSC mode 3.

* * * * *